United States Patent
Nammi et al.

(10) Patent No.: US 9,999,073 B2
(45) Date of Patent: Jun. 12, 2018

(54) SIGNALING ADAPTED CSI-RS PERIODICITIES IN ACTIVE ANTENNA SYSTEMS

(71) Applicant: Telefonaktiebolaget L M Ericsson (publ), Stockholm (SE)

(72) Inventors: Sairamesh Nammi, Kista (SE); Mattias Frenne, Uppsala (SE); Mark Harrison, Grapevine, TX (US); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 14/943,957

(22) Filed: Nov. 17, 2015

(65) Prior Publication Data

US 2016/0143055 A1    May 19, 2016

Related U.S. Application Data

(60) Provisional application No. 62/081,431, filed on Nov. 18, 2014.

(51) Int. Cl.
*H04W 74/00* (2009.01)
*H01Q 21/28* (2006.01)
(Continued)

(52) U.S. Cl.
CPC .......... *H04W 74/006* (2013.01); *H01Q 21/28* (2013.01); *H04B 7/0452* (2013.01);
(Continued)

(58) Field of Classification Search
CPC .... H01Q 21/28; H04B 7/0452; H04B 7/0684; H04B 7/0689; H04W 72/14; H04W 74/006; H04W 74/04
See application file for complete search history.

(56) References Cited

U.S. PATENT DOCUMENTS

| | | | |
|---|---|---|---|
| 2012/0120905 A1* | 5/2012 | Ko | H04B 7/0413 370/329 |
| 2013/0039203 A1* | 2/2013 | Fong | H04B 7/024 370/252 |

(Continued)

FOREIGN PATENT DOCUMENTS

| | | |
|---|---|---|
| EP | 2869478 | 5/2015 |
| WO | WO 2014/007512 | 7/2013 |

(Continued)

OTHER PUBLICATIONS

PCT Notification of Transmittal of the International Search Report and the Written Opinion of the International Searching Authority or the Declaration for International Application No. PCT/IB2015/058934—dated Feb. 5, 2016.

*Primary Examiner* — Khaled Kassim
(74) *Attorney, Agent, or Firm* — Baker Botts, LLP

(57) ABSTRACT

A method in a network node is disclosed. The method comprises grouping a plurality of antenna ports corresponding to a plurality of channel state information reference signals (CSI-RS) into at least a first CSI-RS antenna port group and a second CSI-RS antenna port group, and determining, based at least in part on one or more criteria, a first transmission periodicity for the first CSI-RS antenna port group and a second transmission periodicity for the second CSI-RS antenna port group. The method further comprises transmitting, to one or more user equipment, the CSI-RS corresponding to the antenna ports in the first CSI-RS antenna port group according to the determined first transmission periodicity, and transmitting, to the one or more user equipment, the CSI-RS corresponding to the antenna ports in the second CSI-RS antenna port group according to the determined second transmission periodicity.

26 Claims, 13 Drawing Sheets

(51) Int. Cl.
  *H04W 74/04*   (2009.01)
  *H04W 72/14*   (2009.01)
  *H04B 7/0452*  (2017.01)
  *H04B 7/06*    (2006.01)

(52) U.S. Cl.
  CPC .......... *H04B 7/0684* (2013.01); *H04W 72/14* (2013.01); *H04W 74/04* (2013.01); *H04B 7/0689* (2013.01)

(56) References Cited

U.S. PATENT DOCUMENTS

| | | | |
|---|---|---|---|
| 2014/0016497 A1* | 1/2014 | Seo | H04L 5/0023 370/252 |
| 2015/0124736 A1* | 5/2015 | Ko | H04B 7/0626 370/329 |
| 2015/0180628 A1 | 6/2015 | Kim et al. | |
| 2016/0112167 A1* | 4/2016 | Xu | H04L 5/005 370/329 |
| 2017/0005712 A1* | 1/2017 | Jiang | H04B 7/0413 |
| 2017/0164226 A1* | 6/2017 | Wei | H04W 24/10 |

FOREIGN PATENT DOCUMENTS

| WO | WO 2014/010994 | 1/2014 |
|---|---|---|
| WO | WO 2014/166052 | 10/2014 |

\* cited by examiner

SIGNALING ADAPTED CSI-RS PERIODICITIES IN ACTIVE ANTENNA SYSTEMS

PRIORITY

This application claims the benefit under 35 U.S.C. § 119(e) of the priority of U.S. Provisional Application 62/081,431 filed on Nov. 18, 2014, entitled "Signaling Adapted CSI-RS Periodicities in Active Antenna Systems," the entire disclosure of which is hereby incorporated by reference.

TECHNICAL FIELD

The present disclosure relates, in general, to wireless communications and, more particularly, to signaling adapted CSI-RS periodicities in active antenna systems.

BACKGROUND

3GPP LTE radio interface offers high peak data rates, low delays, and an increase in spectral efficiencies. The LTE ecosystem supports both frequency division duplex (FDD) and time division duplex (TDD), allowing the operators to exploit both the paired and unpaired spectrum, since LTE has flexibility in bandwidth as it supports 6 bandwidths: 1.4 MHz, 3 MHz, 5 MHz, 10 MHz, 15 MHz, and 20 MHz.

The LTE physical layer is designed to achieve higher data rates, and is facilitated by turbo coding/decoding and higher order modulations (up to 64-QAM). The modulation and coding is adaptive, and depends on channel conditions. Orthogonal frequency division multiple access (OFDMA) is used for the downlink, while single carrier frequency division multiple access (SC-FDMA) is used for the uplink. The main advantage of such schemes is that the channel response is flat over a sub-carrier even though the multi-path environment could be frequency selective over the entire bandwidth. This reduces the complexity involved in equalization, as simple single tap frequency domain equalizers can be used at the receiver. OFDMA allows LTE to achieve higher data rates, reduced latency, and improved capacity/coverage with reduced costs to the operator. The LTE physical layer supports HARQ, power weighting of physical resources, uplink power control, and MIMO. By using multiple parallel data streams transmission to a single terminal, data rates can be increased significantly.

In a multi-path environment, such a multiple access scheme also provides opportunities for performance enhancing scheduling strategies. Frequency Selective Scheduling (FSS) can now be used to schedule a user over sub-carriers (or part of the bandwidth) that provides maximum channel gains to that user (and avoid regions of low channel gain). The channel response is measured and the scheduler utilizes this information to intelligently assign resources to users over parts of the bandwidth that maximize their signal-to-noise ratios (and spectral efficiency). In other words, the end-to-end performance of a multi-carrier system like LTE relies significantly on sub-carrier allocation techniques and transmission modes. LTE allows for different opportunistic scheduling techniques; a source of significant product differentiation between competing companies.

The multiple input multiple output (MIMO) is an advanced antenna technique to improve spectral efficiency and thereby boost overall system capacity. The MIMO technique uses a commonly known notation (M×N) to represent MIMO configuration in terms number of transmit (M) and receive antennas (N). The common MIMO configurations used for various technologies are: (2×1), (1×2), (2×2), (4×2), (8×2) and (2×4), (4×4), (8×4). In addition, 3GPP is discussing extending the number of antennas at the base station up to 16/32/64. The configurations represented by (2×1) and (1×2) are special cases of MIMO.

MIMO systems can increase the data carrying capacity of wireless systems. MIMO can be used for achieving diversity gain, spatial multiplexing gain, and beam-forming gain. For these reasons, MIMO is a part of the 3rd and 4th generation wireless systems. In addition, massive MIMO systems are under investigation for 5G systems.

FIG. 1 is a schematic diagram of multi-antenna transmission in LTE. More particularly, FIG. 1 illustrates data modulation 5A and 5B, antenna mapping 10, antenna ports 15, OFDM modulator 20, and antennas 25. Antenna mapping 10 can, in general, be described as a mapping from the output of data modulation 5A and 5B to different antenna ports 15. In the example illustrated in FIG. 1, there may be up to eight antenna ports 15. The input to antenna mapping 10 consists of modulation symbols (e.g., QPSK, 16QAM, 64QAM, 256QAM etc.) corresponding to the one or two transport blocks. More specifically, there is one transport block per Transport Time Interval (TTI), except for spatial multiplexing, in which case there may be two transport blocks per TTI. The output of the antenna mapping 10 is a set of symbols for each antenna port 15. The symbols of each antenna port 15 are subsequently applied to the OFDM modulator 20. In other words, the symbols of each antenna port 15 are mapped to the basic OFDM time-frequency grid corresponding to that antenna port 15. The output of OFDM modulators 20 may then be transmitted by antennas 25. For example, data may be transmitted by antennas 25 to a user equipment (UE).

3GPP LTE provides several different variations on MIMO techniques, from beamforming to spatial multiplexing or single antenna schemes through selection of one of ten Transmission Modes (TMs). These TMs are explained below.

Transmission Mode 1: Single Transmit Antenna Mode. This mode is mandatory for all terminals and used for eNode B which has only a single transmit antenna, for example small cell eNodeBs. This can also be used for macro eNodeBs in cases where using more than 1 Tx antenna is not feasible (e.g., certain antenna sharing scenarios with other 2G/3G technologies).

Transmission Mode 2: Open Loop Transmit Diversity Mode. In this mode, the same information is transmitted through multiple antennas, each with different coding/frequency resources. Alamouti codes are used with 2 antennas as the Space Frequency Block Codes (SFBC). This transmission scheme is also a common fallback mode to single layer transmission with dynamic rank adaptation in other transmission modes. This uses Space Frequency Block Coding (SFBC) for 2TX and SFBC+Frequency Shift Time Diversity (FSTD) STX for 4TX.

Transmission Mode 3: Open Loop Spatial Multiplexing with Cyclic Delay Diversity and Open Loop Transmit Diversity. This mode is also called open loop single user MIMO. As an open loop mode, this requires no PreCoding Matrix Indicator (PMI) but only rank is adapted. Due to its simplicity, this is the widely deployed mode during the initial deployments of 3GPP LTE.

Transmission Mode 4: Closed Loop Spatial Multiplexing (SU MIMO for rank 2 to 4). This has been the primary configuration for the majority of initial Release 8/9 deployments, operating while the channel has rank 2 to 4. It multiplexes up to four layers onto up to 4 antennas. To allow the UE to estimate the channels needed to decode multiple streams, the eNodeB transmits Common Reference Signals (CRS) on prescribed Resource Elements. The UE replies with the PreCoding Matrix Indicator (PMI) indicating which precoding is preferred from the pre-defined codebook. This is used for Single User, SU-MIMO. When the UE is scheduled, a precoding matrix is selected and the UE is informed explicitly or implicitly which precoding matrix was used for the actual physical downlink shared channel (PDSCH) transmission.

Transmission Mode 5: Closed-Loop Multi-User MIMO for rank 2 to 4. This mode is similar to TM4 but for the multi-user case (where multiple users are scheduled within the same resource block).

Transmission Mode 6: Closed Loop Rank 1 Precoding. This mode uses PMI feedback from the UE to select the preferred (one layer) codebook entry (precoding vector) from the pre-defined rank 1 codebook. Since only rank 1 is used, beam-forming gain is expected in this mode but no spatial multiplexing gain.

Transmission Mode 7: Single Layer Beam-forming. In this mode, both the data and the Demodulation Reference Signals (DMRS) are transmitted with the same UE-specific antenna precoder so that the UE does not distinguish the actual number of physical antennas used in the transmission and it does not know the actual precoding weights used as in the classical beam-forming approach (TM6). TM7 is mainly used with TD-LTE where the downlink channel state is well characterized by uplink measurements, due to reciprocity.

Transmission Mode 8: Dual layer beam-forming. This mode was introduced in Release 9. TM8 does classical beam forming with UE-specific DMRSs, like TM7 but for dual layers. This permits the eNode B to weight two separate layers at the antennas so that beam-forming can be combined with spatial multiplexing for one or more UEs. The two layers can be targeted to one or two UEs.

Transmission Mode 9: 8 layer MU-MIMO introduced in Release 10 as part of LTE-Advanced. TM9 implements 2, 4 or 8 reference signals for measurements (CSI-RS) as well as 1 to 8 UE-specific reference signals for demodulation (DMRS). Hence, it is a generalization of TM8 for up to 8 layer transmission and the introduction of CSI-RS enhances the CSI feedback. It is suitable for MU-MIMO with dynamic switching from SU-MIMO. It is applicable to either TDD or FDD systems and it is mandatory for terminals of Release 10 or later.

Transmission mode 10: An enhancement of TM9 where the resources used interference measurements has been further defined by the introduction of CSI-IM. TM10 is optional for terminals of Release 11 or later.

FIG. 2 illustrates an example signal flow diagram for downlink data transfer in LTE. At step 205, UE 110 receives pilot or reference signals transmitted by network node 115, such as an eNodeB. From the pilot or reference signals, UE 110 computes channel estimates, and then computes the parameters needed for channel state information (CSI) reporting. The CSI report may include, for example, a channel quality indicator (CQI), a precoding matrix indicator (PMI), and rank information (RI).

At step 210, UE 110 sends the CSI report to network node 115 via a feedback channel, such as, for example, the physical uplink control channel (PUCCH) or the physical uplink shared channel (PUSCH). The PUCCH may be used for periodic CSI reporting, while the PUSCH may be used for aperiodic reporting. A scheduler associated with network node 115 uses this information in choosing the parameters for scheduling of UE 110. At step 215, network node 115 sends the scheduling parameters to UE 110 in the downlink control channel called physical downlink control channel (PDCCH). At step 220, actual data transfer takes place from network node 115 to UE 110. Data transfer between network node 115 and UE 110 may continue for any suitable period of time. In certain circumstances, however, it may become necessary for UE 110 to be handed over from network node 115 to another network node (i.e., a target network node). The handover (HO) procedure is described in more detail below.

Downlink reference signals are predefined signals occupying specific resource elements within the downlink time-frequency grid. The LTE specification includes several types of downlink reference signals that are transmitted in different ways and used for different purposes by the receiving terminal:

Cell-specific reference signals (CRS): These reference signals are transmitted in every downlink subframe and in every resource block in the frequency domain, thus covering the entire cell bandwidth. The cell-specific reference signals can be used by the terminal for channel estimation for coherent demodulation of any downlink physical channel except for the physical multicast channel (PMCH) and for PDSCH in the case of transmission modes 7, 8, or 9. The cell-specific reference signals can also be used by the terminal to acquire CSI. Finally, terminal measurements on cell-specific reference signals are used as the basis for cell-selection and handover decisions.

Demodulation reference signals (DM-RS): These reference signals (also sometimes referred to as UE-specific reference signals), are specifically intended to be used by terminals for channel estimation for PDSCH in the case of transmission modes 7, 8, 9 or 10. The label "UE-specific" relates to the fact that each demodulation reference signal is intended for channel estimation by a single terminal. That specific reference signal is then only transmitted within the resource blocks assigned for PDSCH transmission to that terminal.

CSI reference signals (CSI-RS): These reference signals are specifically intended to be used by terminals to acquire CSI in the case when demodulation reference signals are used for channel estimation. CSI-RS have a significantly lower time/frequency density, thus implying less overhead, compared to the cell-specific reference signals.

In addition to these reference signals, there are other reference signals such as Multimedia Broadcast Single Frequency Network (MBSFN) and positioning reference signals used various purposes.

In LTE, the uplink control channel carries information about HARQ-ACK information corresponding to the downlink data transmission, and channel state information. The channel state information typically consists of RI, CQI, and PMI. Either PUCCH or PUSCH can be used to carry this information. Note that the PUCCH reporting is periodic and the periodicity of the PUCCH is configured by the higher layers, while the PUSCH reporting is aperiodic.

In LTE, the downlink control channel (PDCCH) carries information about the scheduling grants. Typically this includes the number of MIMO layers scheduled, transport block sizes, modulation for each codeword, parameters related to HARQ, and sub band locations. Note with DM-RS, there is no need to inform the selected precoding matrix, thereby saving the number of bits in the downlink control channel.

FIG. 3 is a schematic diagram of an example passive antenna array system 300. Passive antenna array system 300 includes baseband processing unit 310, power amplifier 320, power combiner/divider and phase shifter 330, and one or more antennas 340. In passive antenna array system 300, the baseband signals from baseband processing unit 310 are boosted by power amplifier 320, which is connected to the antennas 340 by long feedback cables 350. The use of long feedback cables 350 may result in cable losses, potentially leading to decreased performance and increased energy consumption. Furthermore, installation of passive antenna systems may be more complex, and may require more equipment space.

FIG. 4 is a schematic diagram of an exemplary active-array-antenna system 400. Active-array-antenna system (AAS) 400 may include radio frequency (RF) components, such as power amplifiers and transceivers, integrated with an array of antenna elements. For example, AAS 400 may include baseband processing unit 410, radio transceiver array 420, and antennas 430. Baseband processing unit 410 may perform the processing functions of AAS 400. Radio transceiver array 420 may include any suitable number of transceivers. Transceivers of radio transceiver array 420 may contain transmit chains and receive chains. Transmit chains may contain typical components such as filters, mixers, power amplifiers (PAs), and any other suitable components. Receive chains may contain typical components such as filtering, low noise amplifiers (LNAs), and any other suitable components. In some cases, the number of transmitters may not be equal to the number of receivers. AAS 400 may include any suitable number of antenna elements 430 in any suitable arrangement. For example, a number of potential physical arrangements exist, which may include (but are not limited to) uniform linear, matrix and circular. Typically, cross polarized arrangements are deployed with an antenna element for each polarization. AAS 400 offers several benefits compared to deployments having passive antennas connected to transceivers through long feeder cables, such as passive antenna array 300 illustrated in FIG. 3. For example, by using active antenna array 400, cable losses may be reduced, leading to improved performance and reduced energy consumption. As another example, the installation may be simplified, and the required equipment space may be reduced.

AAS 400 may have numerous applications. As one example, AAS 400 may be able to perform one or more of cell specific beamforming, user specific beamforming, vertical sectorization, massive MIMO, and elevation beamforming. AAS 400 may also be an enabler for further-advanced antenna concepts, such as deploying large numbers of MIMO antenna elements at an eNodeB. For these reasons, 3GPP started a study item investigating the feasibility to increase the number of transmit antennas to 16/32/64 for various purposes, as well as extending the CSI feedback to support 2-dimensional antenna arrays where the up to 64 eNode B antenna ports are distributed both in vertical and horizontal directions. When the number of antennas is increased beyond a threshold (e.g., 64 or beyond), however, the overhead due to the minimum number of reference signals configured based on traditional approaches also becomes very high.

SUMMARY

To address the foregoing problems with existing solutions, disclosed is a method in a network node. The method comprises grouping a plurality of antenna ports corresponding to a plurality of channel state information reference signals (CSI-RS) into at least a first CSI-RS antenna port group and a second CSI-RS antenna port group. The method further comprises determining, based at least in part on one or more criteria, a first transmission periodicity for the first CSI-RS antenna port group and a second transmission periodicity for the second CSI-RS antenna port group. The method further comprises transmitting, to one or more user equipment, the CSI-RS corresponding to the antenna ports in the first CSI-RS antenna port group according to the determined first transmission periodicity, and transmitting, to the one or more user equipment, the CSI-RS corresponding to the antenna ports in the second CSI-RS antenna port group according to the determined second transmission periodicity.

In certain embodiments, the first and second transmission periodicities are measured in transmission time intervals. The first CSI-RS antenna port group and second CSI-RS antenna port group may be predefined. The one or more criteria may comprise one or more of: an application or use case; a Doppler metric of one or more user equipment; a speed of the one or more user equipment; and a recommendation of the one or more user equipment.

In certain embodiments, the method may further comprise communicating information about the determined transmission periodicities to the one or more user equipment. In certain embodiments, the information communicated to the one or more user equipment about the determined transmission periodicities may comprise information about the determined transmission periodicity of each CSI-RS antenna port. In certain embodiments, the information communicated to the one or more user equipment about the determined transmission periodicities may comprise information about the determined transmission periodicity for the first and second CSI-RS antenna port groups.

In certain embodiments, the method may further comprise configuring the one or more user equipment with a first channel state information (CSI) reporting periodicity for the CSI-RS corresponding to the first group of CSI-RS antenna ports and a second CSI reporting periodicity for the CSI-RS corresponding to the second group of CSI-RS antenna ports. The method may further comprise receiving, from the one or more user equipment, a recommended value or range of values for the first transmission periodicity of the first CSI-RS antenna port group and the second transmission periodicity of the second CSI-RS antenna port group.

In certain embodiments, the one or more criteria may comprise the application or use case, and the first transmission periodicity of the first CSI-RS antenna port group may be determined independently from the second transmission periodicity of the second CSI-RS antenna port group. In certain embodiments, the first CSI-RS antenna port group may comprise a subset of the plurality of antenna ports corresponding to CSI-RS used to compute CSI in the horizontal (azimuth) direction, and the second CSI-RS antenna port group may comprise a subset of the plurality of antenna ports corresponding to CSI-RS used to compute CSI in the vertical (elevation) domain. In certain embodiments, the one or more criteria may comprise the Doppler metric or speed of the one or more user equipment. The method may further comprise comparing the Doppler metric or speed of the one or more user equipment to a first threshold value, and determining the first transmission periodicity of the first CSI-RS antenna port group and the second transmission periodicity of the second CSI-RS antenna port group based at least in part on the comparison. The Doppler metric or speed of the one or more user equipment may be below the first threshold value, and the method may further comprise setting the value of the second transmission periodicity of the second CSI-RS antenna port group to a higher value than the first transmission periodicity of the first CSI-RS antenna group such that the CSI-RS corresponding to the second CSI-RS antenna port group are transmitted less frequently than the CSI-RS corresponding to the first CSI-RS antenna port group.

In certain embodiments, the method may further comprise configuring the one or more user equipment to report CSI feedback calculated using the first CSI-RS antenna port group. The method may further comprise determining a need for CSI feedback calculated using the first CSI-RS antenna port group and the second CSI-RS antenna port group, and triggering the one or more user equipment to report CSI feedback calculated using the first CSI-RS antenna port group and the second CSI-RS antenna port group. Triggering the one or more user equipment to report CSI feedback calculated using the first CSI-RS antenna port group and the second CSI-RS antenna port group may comprise transmitting, to the one or more user equipment, one of a downlink grant and a medium access control element. The method may further comprise receiving, from the one or more user equipment: a first CSI feedback report corresponding to the first CSI-RS antenna port group; and a second CSI feedback report corresponding to the second CSI-RS antenna port group.

Also disclosed is a network node. The network node comprises one or more processors. The one or more processors are configured to group a plurality of antenna ports corresponding to a plurality of channel state information reference signals (CSI-RS) into at least a first CSI-RS antenna port group and a second CSI-RS antenna port group. The one or more processors are configured to determine, based at least in part on one or more criteria, a first transmission periodicity for the first CSI-RS antenna port group and a second transmission periodicity for the second CSI-RS antenna port group. The one or more processors are configured to transmit, to one or more user equipment, the CSI-RS corresponding to the antenna ports in the first CSI-RS antenna port group according to the determined first transmission periodicity, and transmit, to the one or more user equipment, the CSI-RS corresponding to the antenna ports in the second CSI-RS antenna port group according to the determined second transmission periodicity.

Also disclosed is a method in a user equipment. The method comprises obtaining information about a grouping of a plurality of antenna ports corresponding to a plurality of channel state information reference signals (CSI-RS) into at least a first CSI-RS antenna port group and a second CSI-RS antenna port group, the first CSI-RS antenna port group having a first transmission periodicity and the second CSI-RS antenna port group having a second transmission periodicity such that the CSI-RS corresponding to the antenna ports of the first CSI-RS antenna port group are transmitted at a different time than the CSI-RS corresponding to the antenna ports of the second CSI-RS antenna port group. The method further comprises performing CSI measurements on CSI-RS corresponding to the first CSI-RS antenna port group transmitted according to the first transmission periodicity and on CSI-RS corresponding to the second CSI-RS antenna port group transmitted according to the second transmission periodicity. The method further comprises reporting CSI measurement results to a network node.

In certain embodiments, the first and second transmission periodicities may be measured in transmission time intervals. Performing CSI measurements on CSI-RS corresponding to the first CSI-RS antenna port group transmitted according to the first transmission periodicity and on CSI-RS corresponding to the second CSI-RS antenna port group transmitted according to the second transmission periodicity may comprise determining, at a first point in time, a first channel estimate based on the CSI-RS corresponding to the antenna ports of the first CSI-RS antenna port group transmitted according to the first transmission periodicity. The method may further comprise determining, at a second point in time later than the first point in time, a second channel estimate based on the CSI-RS corresponding to the antenna ports of the second CSI-RS antenna port group transmitted according to the second transmission periodicity. The method may further comprise forming a channel matrix using the first channel estimate based on the CSI-RS corresponding to the first CSI-RS antenna port group and the second channel estimate based on the CSI-RS corresponding to the second CSI-RS antenna port group, and computing one or more channel state information (CSI) parameters based on the channel matrix. The method may further comprise determining, at a third point in time later than the second point in time, a third channel estimate based on the CSI-RS corresponding to the antenna ports of the first CSI-RS antenna port group transmitted according to the first transmission periodicity, and updating the channel matrix using the second channel estimate based on the CSI-RS corresponding to the second CSI-RS antenna port group and the third channel estimate based on the CSI-RS corresponding to the first CSI-RS antenna port group. The method may further comprise computing one or more channel state information parameters based on the updated channel matrix.

In certain embodiments, the method may further comprise determining, based on the obtained information, one or more effective reporting periodicities for reporting CSI measurement results to the network node. Reporting CSI measurement results to the network node may comprise reporting CSI measurements to the network node according to the determined one or more effective reporting periodicities. Obtaining information may comprise receiving information about the first transmission periodicity of the first CSI-RS antenna port group and the second transmission periodicity of the second CSI-RS antenna port group. The received information may comprise one of: information about a determined transmission periodicity of each CSI-RS antenna port; and information about a determined transmission periodicity of the first and second CSI-RS antenna port groups.

In certain embodiments, the method may further comprise determining a recommended value or range of values for the first transmission periodicity of the first CSI-RS antenna port group and the second transmission periodicity of the second CSI-RS antenna port group, and sending, to the network node, the determined recommended value or range of values for the first transmission periodicity of the first CSI-RS antenna port group and the second transmission periodicity of the second CSI-RS antenna port group. The determined recommended value or range of values for the first and second transmission periodicities may be based on one or more criteria. The one or more criteria may comprise: a location of the user equipment; and a speed of the user equipment. In certain embodiments, the first CSI-RS antenna port group may comprise a subset of the plurality of antenna ports corresponding to CSI-RS used to compute CSI in the horizontal (azimuth) direction, and the second CSI-RS antenna port group may comprise a subset of the plurality of antenna ports corresponding to CSI-RS used to compute CSI in the vertical (elevation) domain.

In certain embodiments, reporting CSI measurement results to the network node may comprise transmitting CSI feedback calculated using the first CSI-RS antenna port group. The method may further comprise transmitting, to the network node, a first CSI feedback report corresponding to the first CSI-RS antenna port group and a second CSI feedback report corresponding to the second CSI-RS antenna port group, wherein transmitting the first CSI feedback report and the second CSI feedback report is triggered by the network node. In certain embodiments, transmitting the first CSI feedback report and the second CSI feedback report may be triggered upon one or more of: receiving a downlink grant; and receiving a medium access control element.

Also disclosed is a user equipment. The user equipment comprises one or more processors. The one or more processors are configured to obtain information about a grouping of a plurality of antenna ports corresponding to a plurality of channel state information reference signals (CSI-RS) into at least a first CSI-RS antenna port group and a second CSI-RS antenna port group, the first CSI-RS antenna port group having a first transmission periodicity and the second CSI-RS antenna port group having a second transmission periodicity such that the CSI-RS corresponding to the antenna ports of the first CSI-RS antenna port group are transmitted at a different time than the CSI-RS corresponding to the antenna ports of the second CSI-RS antenna port group. The one or more processors are configured to perform CSI measurements on CSI-RS corresponding to the first CSI-RS antenna port group transmitted according to the first transmission periodicity and on CSI-RS corresponding to the second CSI-RS antenna port group transmitted according to the second transmission periodicity. The one or more processors are configured to report CSI measurement results to a network node.

Certain embodiments of the present disclosure may provide one or more technical advantages. For example, the various network node embodiments described herein may advantageously allow resources to be saved by transmitting CSI-RS on some antenna ports with longer cycles. These resources can be used for transmitting data, thereby improving the capacity of the system. As another example, the various UE embodiments described herein may advantageously facilitate a reduction in UE complexity for UEs served by a network node with an active antenna system with large number of antenna ports. This reduction is achieved because the UE does not have to measure CSI based on CSI-RS on all antenna ports in a given subframe. As yet another example, the various embodiments described herein may advantageously facilitate a reduction in interference statistically at the UEs due to lower periodicity of CSI-RS in certain antenna ports in the network node. Moreover, the various embodiments described herein may facilitate power savings at UEs served by a network node with an active antenna system with large number of antenna ports because the UE does not having to continuously measure CSI based on CSI-RS on all antenna ports. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
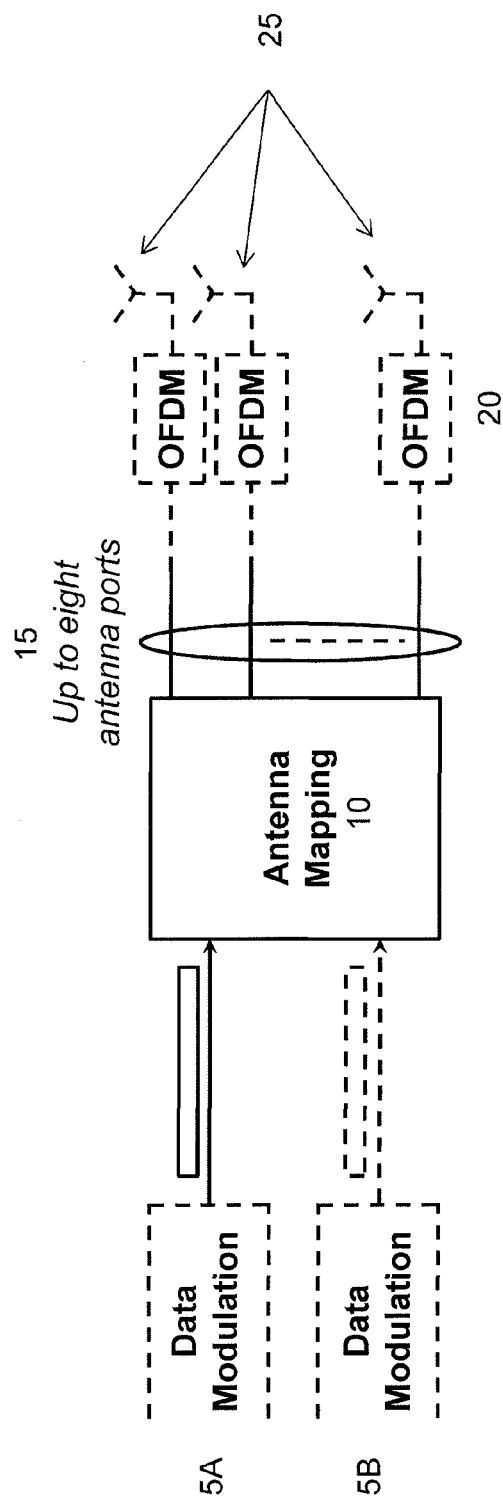
FIG. 1 is a schematic diagram of multi-antenna transmission in LTE.
Figure 2:
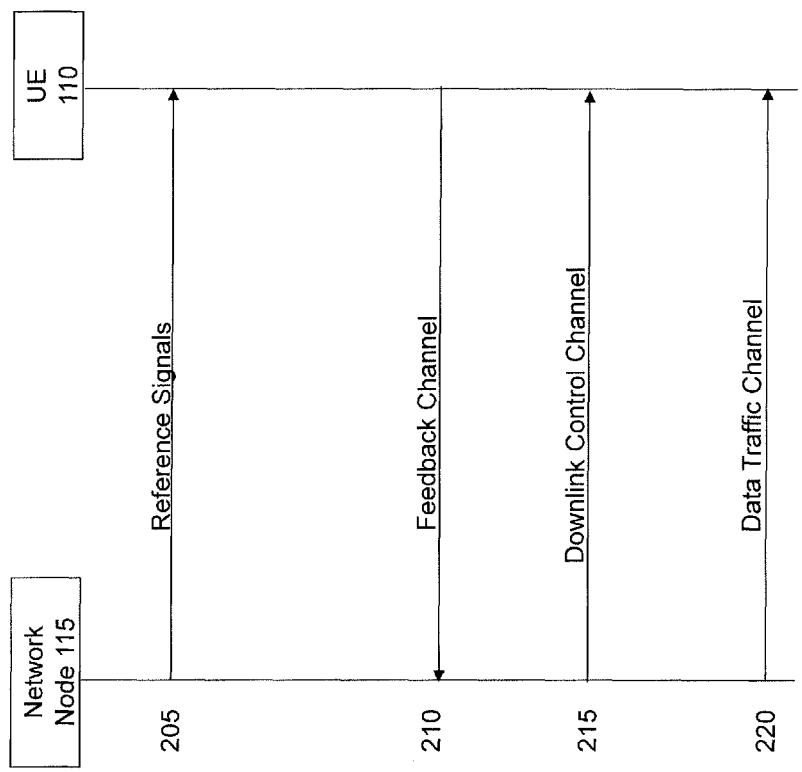
FIG. 2 illustrates an example signal flow diagram for downlink data transfer in LTE.
Figure 3:
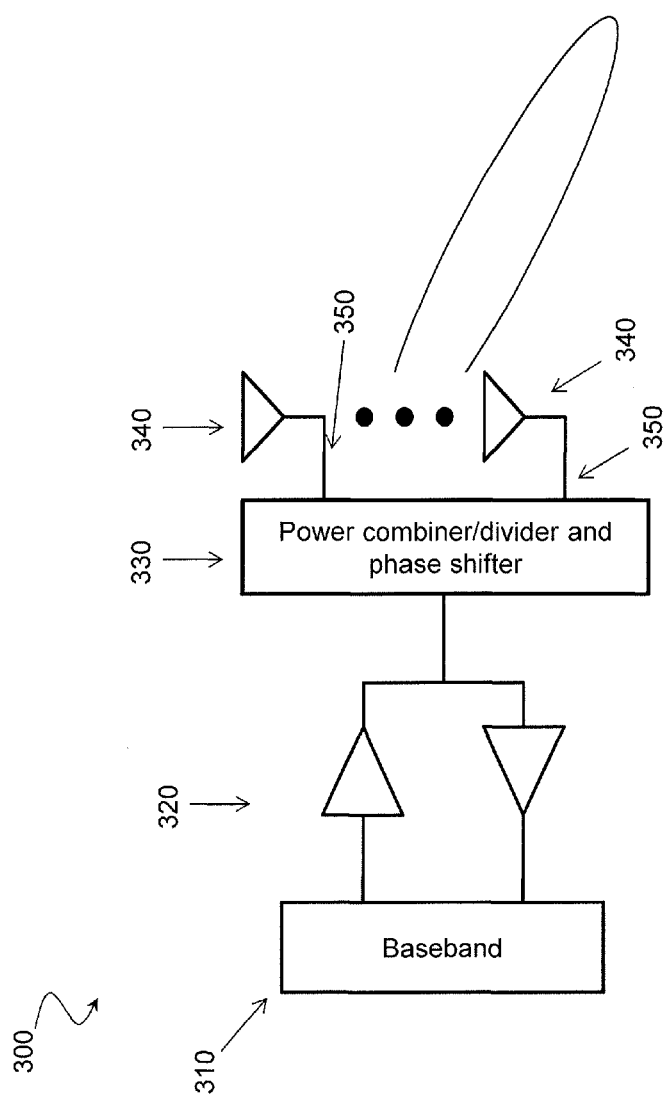
FIG. 3 is a schematic diagram of an example passive antenna array system.

As described above, active-array-antenna systems offer several benefits compared to deployments having passive antennas, such as reduced cable losses leading to improved performance and reduced energy consumption, as well as simplified installation and reduced required equipment space. Active-array-antenna systems also have numerous applications, such as cell specific beamforming, user specific beamforming, vertical sectorization, massive MIMO, and elevation beamforming. Many of these benefits and features result from the ability of active-array-antenna systems to employ very large numbers of antenna elements. When the number of antennas is increased beyond a threshold (e.g., 64 or beyond), however, then the overhead due to the minimum number of reference signals configured based on traditional approaches becomes very high.

For example, the number of CSI-RS signals needed for a 64-antenna system is 64 (e.g., 8×8 antenna elements in a 2-dimensional antenna active antenna system). A more advanced and future 2-dimensional antenna active antenna system may comprise of 16×16 or even 32×32 antenna elements. Transmission of such a larger number of reference signals (e.g., CSI-RS) will require extensive radio resources (e.g., resource elements, transmit power, etc.) and will also reduce the availability of radio resources for data transmission. The overheads due to reference signal transmission in an active-array-antenna system with a large number of antennas in turn will reduce the user throughput, thereby reducing the capacity or beam-forming benefits of the active antenna system.

The present disclosure contemplates various embodiments that may reduce or eliminate these and other problems associated with transmission of reference signals in active-array-antenna systems. As one example, in certain embodiments a network node groups a plurality of antenna ports corresponding to a plurality of channel state information reference signals (CSI-RS) into at least a first CSI-RS antenna port group and a second CSI-RS antenna port group. The network node determines, based at least in part on one or more criteria, a first transmission periodicity for the first CSI-RS antenna port group and a second transmission periodicity for the second CSI-RS antenna port group. The network node transmits, to one or more user equipment, the CSI-RS corresponding to the antenna ports in the first CSI-RS antenna port group according to the determined first transmission periodicity. The network node transmits, to the one or more user equipment, the CSI-RS corresponding to the antenna ports in the second CSI-RS antenna port group according to the determined second transmission periodicity. Such an embodiment may advantageously allow resources to be saved by transmitting CSI-RS on some antenna ports with longer cycles. These resources can be used for transmitting data, thereby improving the capacity of the system. In an addition, such an embodiment may facilitate a reduction in interference statistically at the UEs due to lower periodicity of CSI-RS in certain antenna ports in the network node.

As another example, in certain embodiments a user equipment obtains information about a grouping of a plurality of antenna ports corresponding to a plurality of channel state information reference signals (CSI-RS) into at least a first CSI-RS antenna port group and a second CSI-RS antenna port group, the first CSI-RS antenna port group having a first transmission periodicity and the second CSI-RS antenna port group having a second transmission periodicity such that the CSI-RS corresponding to the antenna ports of the first CSI-RS antenna port group are transmitted at a different time than the CSI-RS corresponding to the antenna ports of the second CSI-RS antenna port group. The user equipment performs CSI measurements on CSI-RS corresponding to the first CSI-RS antenna port group transmitted according to the first transmission periodicity and on CSI-RS corresponding to the second CSI-RS antenna port group transmitted according to the second transmission periodicity. The user equipment reports CSI measurement results to a network node. Such an embodiment may advantageously facilitate a reduction in UE complexity for UEs served by a network node with an active antenna system with a large number of antenna ports. This reduction may be achieved because the UE does not have to measure CSI based on CSI-RS on all antenna ports in a given subframe. In addition, such an embodiment may facilitate power savings at UEs because the UE does not having to continuously measure CSI based on CSI-RS on all antenna ports.

Figure 5:
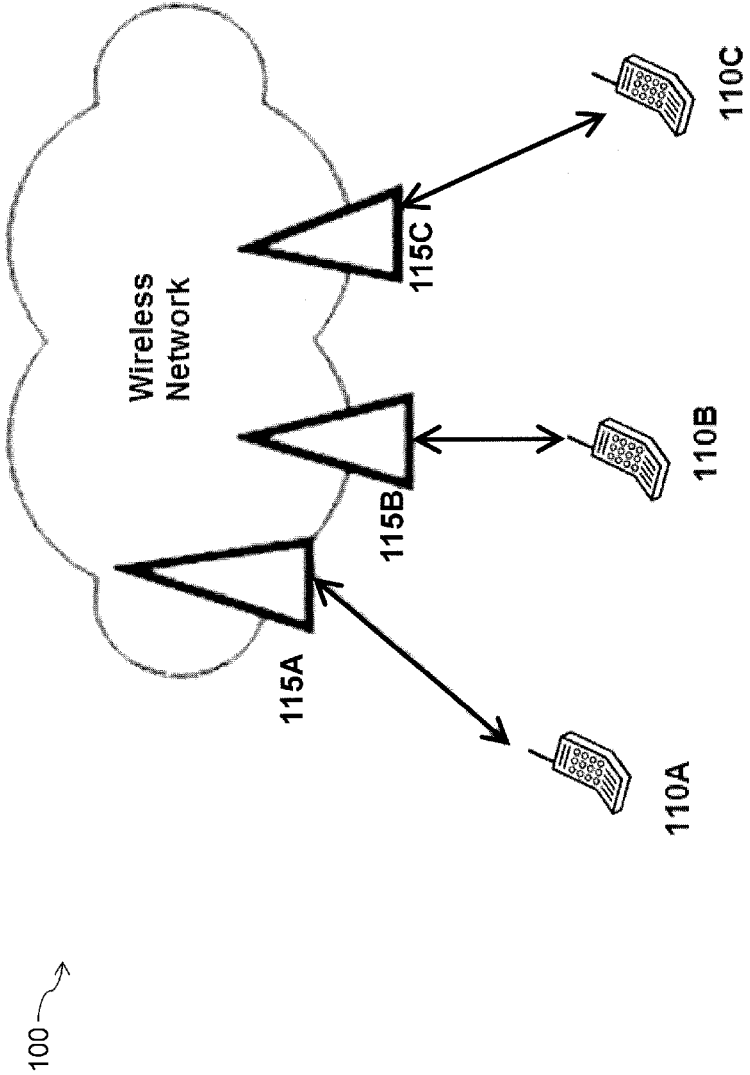
FIG. 5 is a block diagram illustrating an embodiment of a network, in accordance with certain embodiments.

FIG. 5 is a block diagram illustrating an embodiment of a network 100, in accordance with certain embodiments. Network 100 includes one or more UE(s) 110 (which may be interchangeably referred to as wireless devices 110 or simply device 110) and network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be performed by network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

Figure 4:
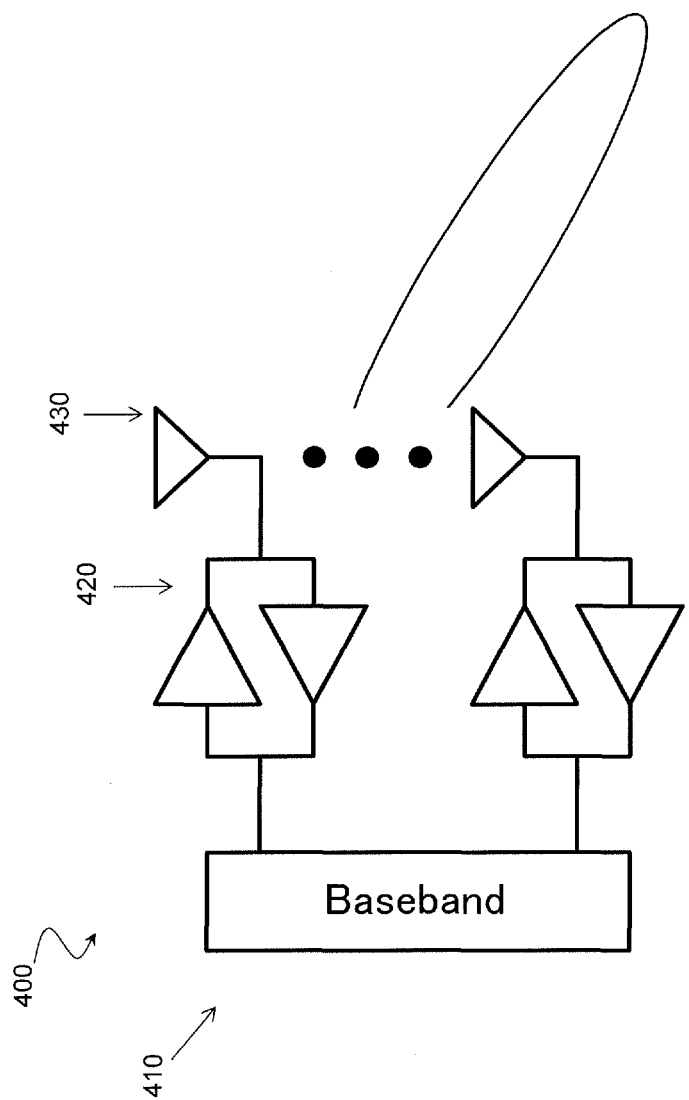
FIG. 4 is a schematic diagram of an exemplary active-array-antenna system.

As described above, example embodiments of network 100 may include one or more UEs 110, and one or more different types of network nodes capable of communicating (directly or indirectly) with UEs 110. UEs 110 described herein can be any type of wireless device capable of communicating with network nodes 115 or another UE over radio signals. UE 110 may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), or any other suitable device. Also, in some embodiments generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT, or any suitable network node. In certain embodiments, network node 115 may include an active-antenna-array system such as the one described above in relation to FIG. 4. Example embodiments of UEs 110, network nodes 115, and other network nodes (such as radio network controller or core network node) are described in more detail with respect to FIGS. 9, 10, and 11, respectively.

Although FIG. 5 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies.

As described above, when the number of antennas in network node 115 is increased beyond a threshold (e.g., 64 or beyond), then the overhead due to the minimum number of reference signals configured based on traditional approaches also becomes very high. Transmission of such a larger number of reference signals requires extensive radio resources (e.g., resource elements, transmit power, etc.) and reduces the availability of radio resources for data transmission. The overheads due to reference signal transmission in an active-array-antenna system with a large number of antennas in turn will reduce the user throughput, thereby reducing the capacity or beam-forming benefits of the active antenna system. If, however, a UE (such as UE 110A) uses a relatively small number of reference signals (transmitted by a network node, such as network node 115A) for operations such as channel estimation, CSI reporting (e.g., CQI, rank indicator, pre-coding matrix indicator (PMI), etc.), the throughput performance loss may be reduced. For example, in certain embodiments, even though UE 110A can be configured to perform measurements on many antenna ports, UE 110A may use a subset or a group of CSI-RS antenna ports (i.e., partial CSI-RS transmitted by a few or a subset of antenna ports) to compute the CSI for channel estimation, link adaptation, or any other suitable purpose. Although the various embodiments disclosed herein may be described using CSI-RS as an example, the present disclosure contemplates that the various embodiments described herein may be applicable to any suitable type of reference signal (e.g., CRS, DM-RS, CSI-RS, etc.).

In certain embodiments, network node 115 may group a plurality of antenna ports corresponding to a plurality of channel state information reference signals (CSI-RS) to form at least a first CSI-RS antenna port group and a second CSI-RS antenna port group. Network node 115 may determine, based at least in part on one or more criteria, a first transmission periodicity for the first CSI-RS antenna port group and a second transmission periodicity for the second CSI-RS antenna port group. Network node 115 may transmit the CSI-RS associated with the antenna ports in the first CSI-RS antenna port group according to the determined first transmission periodicity, and transmit the CSI-RS associated with the antenna ports in the second CSI-RS antenna port group according to the determined second transmission periodicity.

Network node 115 may group the plurality of antenna ports in any suitable manner. As one example, the selection of CSI-RS antenna port groups may be performed such that CSI-RS transmitted on differently polarized elements, or well-separated spatially diverse elements, may be grouped together. The radio channel state of differently polarized or spatially diverse elements is likely to change more frequently over frequency and time than co-polarized, closely spaced elements, so the differently polarized or spatially diverse group can be configured with a shorter periodicity. As another example, the selection of CSI-RS antenna port groups may be performed such that a group of CSI-RS antenna ports allows UE 110 to estimate the horizontal PMI. As yet another example, the selection of CSI-RS antenna port groups may be performed such that a group of CSI-RS antenna ports provides information about vertical PMI. The mobility of UE 110 is expected to be lowest in the vertical direction. Hence, in certain embodiments there may be three different CSI-RS antenna port groups corresponding to polarization or spatial diversity, horizontal and vertical pre-coding determination. In some cases, the three different CSI-RS antenna port groups may have three different periodicities. In certain embodiments the first CSI-RS antenna port group and the second CSI-RS antenna port group may be predefined.

Network node 115 may determine the first transmission periodicity of the first CSI-RS antenna port group and the second transmission periodicity for the second CSI-RS antenna port group based on any suitable criteria. For example, network node 115 may determine the periodicity of the CSI-RS based on one or more of an application or use case, a Doppler Metric of UE 110, a speed of UE 100, a recommendation from UE 110, a combination of any of the above, or any other suitable criterion.

In certain embodiments, the CSI-RS antenna ports and their corresponding CSI-RS can be grouped and configured with different transmission periodicities by network node 115 based on the application or use case. The grouping and configuring of different periodicities may be based on any suitable application or use case. For example, the use case may be whether UE 110 is located indoors, in a high-rise building, on a floor level in a large building, etc. As one example, in an elevation beam-forming scenario, UE 110 may be configured with 8 CSI-RS on antenna ports 1-8 and 8 CSI-RS on antenna ports 9-16 of network node 115. The 8 CSI-RS on antenna ports 1-8 may be used for horizontal CSI reporting, and the 8 CSI-RS on antenna ports 9-16 may be used for vertical CSI reporting. The transmission periodicity for CSI-RS on antenna ports 1-8 can be set to a first transmission periodicity (T1), and the transmission periodicity for CSI-RS (9-15) can be set to a second transmission periodicity (T2). In some embodiments, network node 115 can determine whether UE 110 is located in an elevation beam-forming scenario based on UE location information and/or based on pre-defined knowledge of geographical area (e.g., height of buildings, etc.).

In certain embodiments, the CSI-RS antenna ports and their corresponding CSI-RS can be grouped and configured with different transmission periodicities by network node 115 based on the Doppler metric of UE 110 and/or the speed of UE 110. For example, if UE 110 is moving with a speed below a threshold (e.g., 3 km/hr), the periodicity of some of the CSI-RS antenna port groups can be set to a high value (which implies that some of the CSI-RS antenna ports can be sparsely transmitted (e.g., with transmission periodicity once every 16 ms). In another case, the starting point of some of the CSI-RS can be different, and their transmission rate can be set to a high value (e.g., with periodicity once every 2 ms).

The Doppler metric may be computed in any suitable manner. As one example, the Doppler metric may be computed using a direct speed measurement. In a direct speed measurement, network node 115 can compute the direct speed of UE 110 according to a positioning method, such as OTDOA, enhanced cell ID or using GNSS (e.g., GPS) at multiple intervals. Then the Doppler metric ($D_m$) can be taken as average of the individual speed measurement. As another example, the Doppler metric may be computed using rate of change of uplink channel estimates. In this case, the speed of UE 110 can be determined by network node 115 by measuring Doppler frequency on the received signals transmitted by UE 110, etc. For example, network node 115 may estimate the signals received at the uplink channel transmitted by UE 110. The rate of change of the received uplink channel gives a measure of the Doppler metric.

In certain embodiments, the CSI-RS antenna ports and their corresponding CSI-RS can be grouped and configured with different transmission periodicities by network node 115 based on a recommendation from UE 110. For example, UE 110 may determine the transmission periodicities with which (or range of periodicities within which) the CSI-RS need to be transmitted by network node 115 from different groups of antenna ports in network node 115. UE 110 may then send information about the recommended transmission periodicities for the CSI-RS corresponding to the different groups of antenna ports to network node 115.

UE 110 may determine the transmission periodicities of different groups of antenna ports based on any suitable criteria. For example, UE 110 may determine the transmission periodicities based on UE location (e.g., whether UE 110 is at a height above a threshold or at ground level), UE speed, or any other suitable criteria. The UE location can be determined by UE 110 based on one or more existing positioning methods (e.g., GNSS such as GPS, OTDOA, enhanced cell ID, or any other suitable positioning method). The UE speed can be determined by UE 110 based on an estimation of Doppler frequency, etc. As one example, if UE speed is below a threshold (e.g., 3 km/hr) then UE 110 can recommend that the transmission periodicity of the reference signals (e.g., CSI-RS) in one or more groups of antenna ports be transmitted with a smaller value (e.g., with 16 ms transmission periodicity) by network node 115. As another example, UE 110 may determine that it is located at a height above a threshold (e.g., 30 meters or above). In such a case, UE 110 may recommend that reference signals from at least one group of antenna ports are transmitted more frequently (e.g., every 2 ms), whereas the reference signals from remaining groups of antenna ports may be transmitted sparsely with different periodicities (e.g., 8 ms, 16 ms, 32 ms in three different groups of antenna ports, respectively).

In certain embodiments, the CSI-RS antenna ports and their corresponding CSI-RS can be grouped and configured with different transmission periodicities by network node 115 based on a combination of any of the above described criteria. For example, any combination of two or more criteria described above (e.g., application or use case, doppler metric or UE speed, and UE recommendation) can be used by network node 115 for determining the transmission periodicity of the CSI-RS in different groups of antenna ports in network node 115.

In certain embodiments, network node 115 may communicate information about the determined transmission periodicities for the CSI-RS antenna port groups to UE 110. The information about the determined transmission periodicities for the CSI-RS antenna port groups may be communicated to UE 110 in any suitable manner. For example, network node 115, after determining the transmission periodicities of the CSI-RS antenna port groups, may communicate the information about the determined transmission periodicities and associated CSI-RS to UE 110 using higher layer signaling. As another example, in certain embodiments network node 115 may communicate information about the determined transmission periodicities using lower layers, such as L1 or MAC. In some cases, the information about the determined transmission periodicities and associated CSI-RS is determined by network node 115 for each UE 110 or for a group of UEs 110 (e.g., UEs 110 operating in similar conditions or criteria).

Network node 115 may communicate the information about the determined transmission periodicities in any suitable manner. As one example, network node 115 may send a bit map corresponding to each CSI-RS port number and the periodicity of the occurrence of that CSI-RS. For example, Table 1 below shows a binary mapping of individual CSI-RS periodicity:

TABLE 1

Example Binary Mapping of CSI-RS Periodicities

| Binary combination | CSI-RS periodicity in TTI (msec) |
|---|---|
| 000 | 5 |
| 001 | 10 |
| 010 | 15 |
| 011 | 20 |
| 100 | 40 |
| 101 | 80 |
| 110 | 160 |
| 111 | 320 |

Table 2 below shows one example of how these periodicities may be conveyed, assuming the network configures 16 CSI-RS.

TABLE 2

An example showing the group of CS-RS AP have the same periodicity

| CSI-RS number | Periodicity |
|---|---|
| 1 | 000 |
| 2 | 000 |
| 3 | 000 |
| 4 | 000 |
| 5 | 000 |
| 6 | 000 |
| 7 | 000 |
| 8 | 000 |
| 9 | 101 |
| 10 | 101 |
| 11 | 101 |
| 12 | 101 |
| 13 | 101 |
| 14 | 101 |
| 15 | 101 |
| 16 | 101 |

As shown in Table 2, one group of CSI-RS (numbers 1-8) uses a periodicity of 5 msec and the other group of CSI-RS (numbers 9-16) uses a periodicity of 80 msec. This a typical application of elevation beamforming, where the first group of CSI-RS are used to compute CSI in the horizontal (azimuth) direction and the second group of CSI-RS are used to compute the CSI in the vertical (elevation) domain.

According to an embodiment, network node 115 can send information about the group of CSI-RS and information about the transmission periodicity associated with each group of CSI-RS to UE 110. The different possible periodicities may also be pre-defined (such as, for example, 1 ms, 2 ms, 4 ms, 8 ms, 16 ms, etc.). Therefore, network node 115 may signal to UE 110 only the pre-defined identifiers of the periodicities of the reference signals in different groups of antenna ports.

According to an embodiment, the plurality of groups of CSI-RS may be pre-defined for each antenna configuration in a network node (e.g., 4 groups each of 16 antennas in a network node with 64-antenna ports, etc.). Each pre-defined group can be associated with a pre-defined identifier (e.g., ID#0, ID#1, ID#2 and ID#3 for 4 groups). Network node 115 can determine periodicities of transmission of reference signals in each group of antenna ports and signal only the pre-defined IDs of each group and their associated periodicities with which they transmit reference signals. This may advantageously reduce signaling overheads.

Network node 115 may further configure UE 110 with different CSI reporting periodicities with which UE 110 reports CSI for different groups of antenna ports to network node 115. As one example, network node 115 may configure the CSI reporting periodicities such that they correspond to CSI transmission periodicities for different groups of antenna ports. As another example, network node 115 may configure CSI reporting periodicities that are larger than the corresponding CSI transmission periodicities for different groups of antenna ports. As yet another example, network node 115 may configure only one CSI reporting periodicity, regardless of the CSI transmission periodicities with which CSI-RS are transmitted in different groups of antenna ports. In all the above examples, UE 110 may further apply one or more rules to determine an effective value of CSI reporting periodicity for each antenna port group, as described above.

The various embodiments described herein allow the UE to determine the periodicities of CSI-RS transmissions in each group of antennas in network node 115, and use them for one or more tasks (e.g., channel estimation, CSI reporting, or any other suitable task). In certain embodiments, once UE 110 obtains information about the periodicity of CSI-RS transmission in different groups of antenna ports in network node 115, UE 110 will estimate the channel from the respective CSI-RS during those periods. Once all the elements of the channel matrix are formed, UE 110 will compute the parameters related to channel state information, such as channel quality indicator, rank information, precoding matrix index, K best subband indices out of the CQI values in all subbands, or any other suitable parameter. UE 110 may report these values in any suitable manner. For example, UE 110 may report these values to network node 115 either periodically (e.g., using PUCCH) and/or aperiodically (e.g., using PUSCH).

In some cases, UE 110 can update the channel matrix whenever a new estimate of the elements of the channel matrix is obtained. The same procedure like above is used to report the CSI to network node 115. For example, UE 110 may obtain information about the grouping of a plurality of antenna ports corresponding to a plurality of channel state information reference signals (CSI-RS) into a first CSI-RS antenna port group having a first transmission periodicity and a second CSI-RS antenna port group having a second transmission periodicity. UE 110 may perform CSI measurements on CSI-RS corresponding to the first CSI-RS antenna port group transmitted according to the first transmission periodicity and on CSI-RS corresponding to the second CSI-RS antenna port group transmitted according to the second transmission periodicity. In one example, to perform the CSI measurements, UE 110 may determine, at a first point in time, a first channel estimate based on the CSI-RS corresponding to the antenna ports of the first CSI-RS antenna port group transmitted according to the first transmission periodicity. UE 110 may then determine, at a second point in time later than the first point in time, a second channel estimate based on the CSI-RS corresponding to the antenna ports of the second CSI-RS antenna port group transmitted according to the second transmission periodicity. UE 110 may form a channel matrix using the first channel estimate based on the CSI-RS corresponding to the first CSI-RS antenna port group and the second channel estimate based on the CSI-RS corresponding to the second CSI-RS antenna port group. UE 110 may then compute one or more channel state information (CSI) parameters based on the channel matrix. UE 110 then reports CSI measurement results to network node 115. In some cases, UE 110 may determine, at a third point in time later than the second point in time, a third channel estimate based on the CSI-RS corresponding to the antenna ports of the first CSI-RS antenna port group transmitted according to the first transmission periodicity. UE 110 then updates the channel matrix using the second channel estimate based on the CSI-RS corresponding to the second CSI-RS antenna port group and the third channel estimate based on the CSI-RS corresponding to the first CSI-RS antenna port group. UE 110 may then compute one or more channel state information parameters based on the updated channel matrix. UE 110 may then report updated CSI measurement results to network node 115.

In certain embodiments, UE 110 may adapt the configured CSI reporting period as a function of the transmission periodicity of reference signals in different antenna port groups. The adapted CSI reporting period may also be referred to as effective or true CSI reporting period (as opposed to the configured CSI reporting period). The function for determining the effective CSI reporting period may be any suitable function, and can be predefined or can be configured at UE 110 by network node 115. For example, the function for determining the effective CSI may be a maximum, mean, or any other suitable function.

For example, assume that network node 115 configures UE 110 to signal CQI periodically once every 4 ms. Network node 115 also configures UE 110 with the information that CSI-RS are transmitted by a first group of antenna ports once every 2 ms, and by a second group of antenna ports once every 16 ms. In this example, UE 110 may use a maximum function to determine the effective CSI reporting period for each group. For example, UE 110 may report CSI for the first and second antenna port groups with CSI reporting periods of 4 ms and 16 ms, respectively.

In some cases, such as when UE 110 receives less traffic or is not scheduled on the downlink, UE 110 may monitor and provide CSI feedback using a first CSI-RS antenna port group comprising a smaller number of CSI-RS antenna ports. When there is enough data for UE 110 to be scheduled repeatedly over a short period of time, the UE may be scheduled more aggressively with higher rank and/or using a greater number of downlink antenna ports than is available in the first group. In such a case, UE 110 may monitor the first CSI-RS antenna port group and a second CSI-RS antenna port group. UE 110 may provide CSI feedback using the first and second CSI-RS antenna port groups. Once there is not enough data for UE 110 to be repeatedly scheduled over a short period of time, UE 110 will return to monitoring and provide CSI feedback using the first CSI-RS antenna port group.

In some cases, UE 110 can be triggered to monitor and provide CSI feedback using the first and second CSI-RS antenna port groups when the network is aware that there is enough data to send to UE 110. Such a trigger can be explicitly or implicitly included in a downlink grant or can be carried in a medium access control element (MAC CE). In the explicit case, the trigger can be or more bits carried in the grant or MAC CE, and the trigger can last for a period of time that is either pre-defined or indicated by the trigger. In the implicit case, when UE 110 receives a downlink grant, it begins monitoring the second group, and continues to do so for a predetermined period of time.

The CSI feedback for the first and second CSI-RS antenna port groups may be reported independently or jointly. Also, UE 110 may identify whether the CSI feedback relates to the first or to both the first and second groups. As one example of separate feedback, the feedback is provide in separate information fields in one transmission from UE 110, or alternatively in separate transmissions from UE 110. The groups may relate to horizontal and vertical PMI, respectively, as in the method to select the CSI-RS AP groups described above. In the case of joint feedback, a CSI report may relate to both vertical and horizontal elements, and may comprise an index from a two-dimensional codebook.

Figure 6:
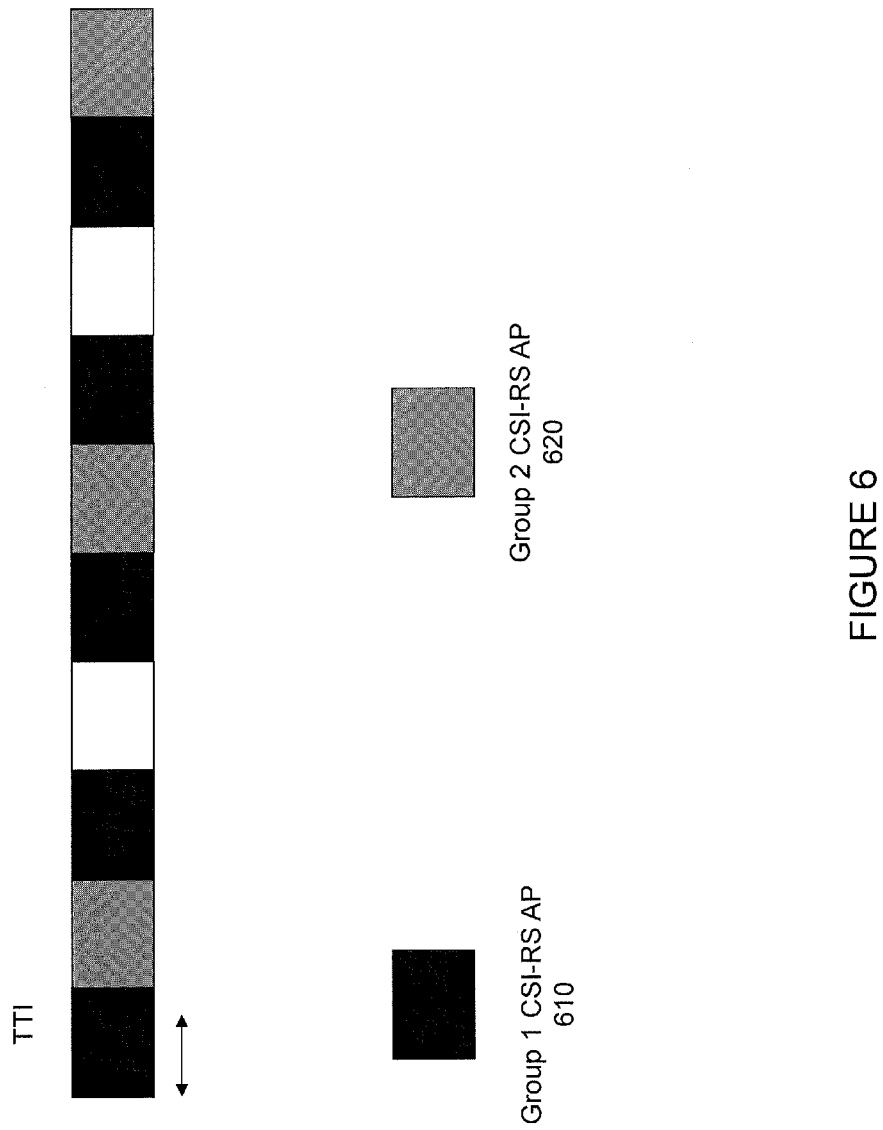
FIG. 6 illustrates two example groups of CSI-RS antenna ports having different periodicities, in accordance with certain embodiments.

FIG. 6 illustrates an example of the variable period for two example groups of CSI-RS antenna ports having different periodicities, in accordance with certain embodiments. More particularly, FIG. 6 illustrates a first CSI-RS antenna port group 610 and a second CSI-RS antenna port group 620. For example, assume that UE 110 is configured with 32 antenna ports, and for CSI computation, UE 110 uses the channel estimation of the first CSI-RS antenna port group of 16 antenna ports CSI-RS in a time period (e.g., subframe, TTI, time slot, symbols, group of symbols, group of TTIs, group of time slots, etc.) and uses the old channel estimate (obtained in a previous time period) for the second CSI-RS antenna port group corresponding to the other antenna ports 17-32. In the example of FIG. 6, the first CSI-RS antenna port group 610 will be transmitted with a first transmission periodicity and the second CSI-RS antenna port group 620 will be transmitted with a second, different transmission periodicity. In the example of FIG. 6, the transmission periodicity of the first CSI-RS antenna port group 610 is set to 2 TTI, and the transmission periodicity of the second CSI-RS antenna port group 620 is set to 4 TTI by the network node transmitting CSI-RS (such as network node 115 described above in relation to FIG. 5). This implies that the transmission periodicity of second CSI-RS antenna port group 620 pilots is reduced by 50%. The resources (time/frequency) allocated for these CSI-RS can advantageously be used by network node 115 for transmission of other signals, such as for scheduling users in the cell (i.e., for data transmission).

In addition, network node 115 can save power since the power allocated for CSI-RS during these times can be used by network node 115 for transmission of data traffic channels (e.g., PDSCH, PMCH, etc.). Network node 115 may even decide not to transmit any signal during the resources where CSI-RS are omitted or muted. This in turn will save the transmission power at network node 115 and also reduce interference experienced by the UEs that don't use the CSI-RS.

Although FIG. 6 illustrates two CSI-RS AP groups 610 and 620, the present disclosure contemplates that the CSI-RS antenna ports can be grouped into any suitable number of groups. For example, the CSI-RS can be grouped into three, four or maximum $N_t$ groups, where $N_t$ is the number of transmit antennas or antenna ports configured. To illustrate, consider the following example. Assume that network node 115 includes 64 antenna ports in a 2D array. Then a first subset A equal to 16 antenna ports that have a certain periodicity T_A=5 msec is selected. As an example, say these are selected in a distributed manner (e.g., every $2^{nd}$ port in the vertical direction and every $2^{nd}$ port in the horizontal direction. Then, a second set B of the 48 antenna ports remains. These are further split into three subsets say B1, B2, and B3 with 16 ports each and each Bi subset have a periodicity T_B=15 msec. Hence for every 5 ms, there are always 16 antenna ports from set A and the 16 ports from one of the subsets B1, B2 or B3. In total, 32 ports are transmitted every 5 msec, thereby reducing the CSI-RS overhead.

Figure 7:
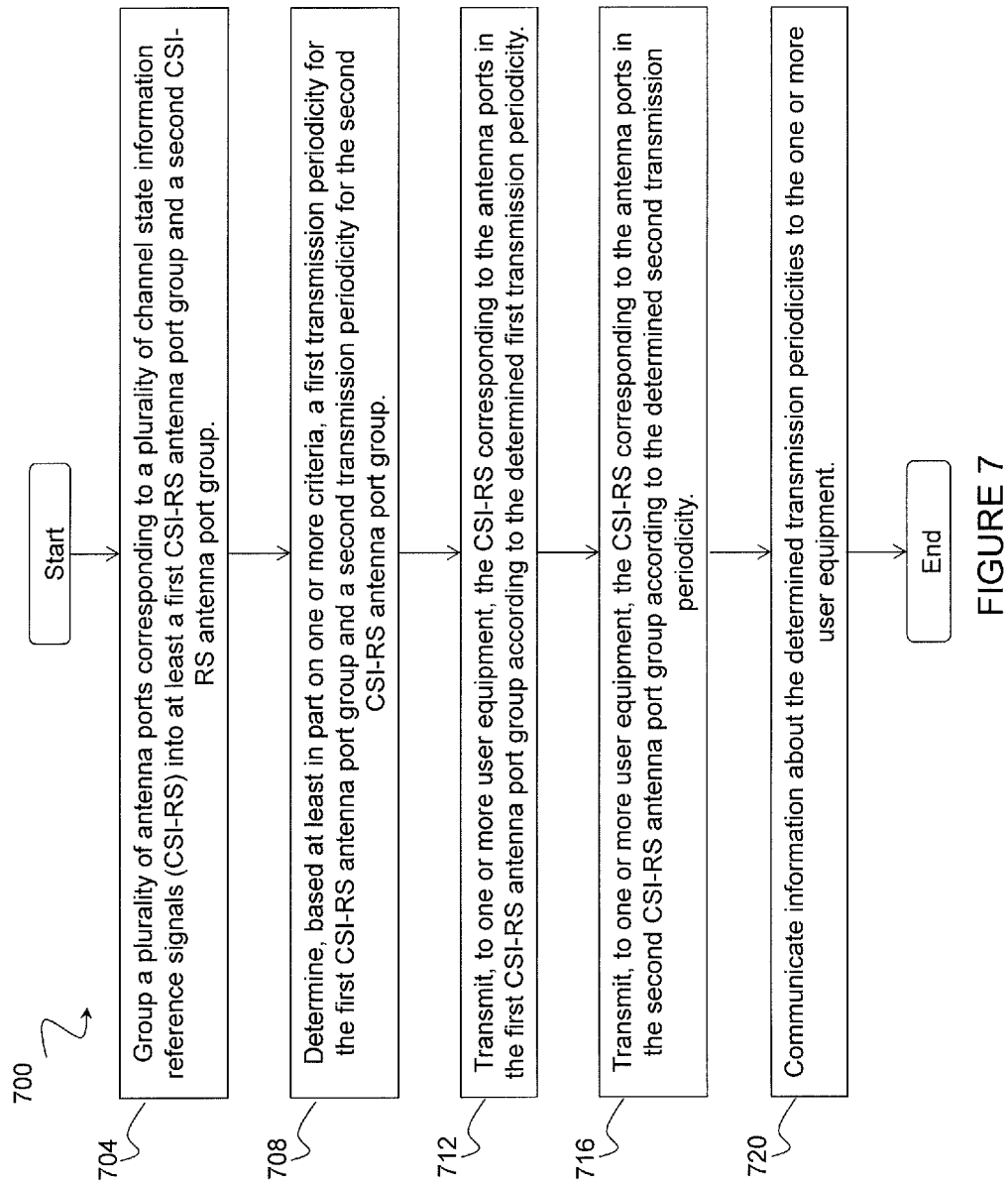
FIG. 7 is a flow diagram of a method in a network node, in accordance with an embodiment.

FIG. 7 is a flow diagram of a method in a network node, in accordance with an embodiment. The method begins at step 704, where the network node groups a plurality of antenna ports corresponding to a plurality of channel state information reference signals (CSI-RS) into at least a first CSI-RS antenna port group and a second CSI-RS antenna port group. In certain embodiments, the first CSI-RS antenna port group and second CSI-RS antenna port group may be predefined.

At step 708, the network node determines, based at least in part on one or more criteria, a first transmission periodicity for the first CSI-RS antenna port group and a second transmission periodicity for the second CSI-RS antenna port group. The first and second transmission periodicities may be measured in transmission time intervals. In certain embodiments, the network node may receive, from the one or more user equipment, a recommended value or range of values for the first transmission periodicity of the first CSI-RS antenna port group and the second transmission periodicity of the second CSI-RS antenna port group. In certain embodiments, the network node may configure the one or more user equipment with a first channel state information (CSI) reporting periodicity for the CSI-RS corresponding to the first group of CSI-RS antenna ports and a second CSI reporting periodicity for the CSI-RS corresponding to the second group of CSI-RS antenna ports.

The one or more criteria may comprise one or more of: an application or use case; a Doppler metric of one or more user equipment; a speed of the one or more user equipment; a recommendation of the one or more user equipment, or any other suitable criteria. In certain embodiments, the one or more criteria may comprise the application or use case, and the first transmission periodicity of the first CSI-RS antenna port group may be determined independently from the second transmission periodicity of the second CSI-RS antenna port group. The first CSI-RS antenna port group may comprise a subset of the plurality of antenna ports corresponding to CSI-RS used to compute CSI in the horizontal (azimuth) direction, and the second CSI-RS antenna port group comprises a subset of the plurality of antenna ports corresponding to CSI-RS used to compute CSI in the vertical (elevation) domain. In certain embodiments, the one or more criteria may comprise the Doppler metric or speed of the one or more user equipment. The network node may compare the Doppler metric or speed of the one or more user equipment to a first threshold value, and determine the first transmission periodicity of the first CSI-RS antenna port group and the second transmission periodicity of the second CSI-RS antenna port group based at least in part on the comparison. In some cases, the Doppler metric or speed of the one or more user equipment may be below the first threshold value, and the network node may set the value of the second transmission periodicity of the second CSI-RS antenna port group to a higher value than the first transmission periodicity of the first CSI-RS antenna group such that the CSI-RS corresponding to the second CSI-RS antenna port group are transmitted less frequently than the CSI-RS corresponding to the first CSI-RS antenna port group.

At step 712, the network node transmits, to one or more user equipment, the CSI-RS corresponding to the antenna ports in the first CSI-RS antenna port group according to the determined first transmission periodicity. At step 716, the network node transmits, to the one or more user equipment, the CSI-RS corresponding to the antenna ports in the second CSI-RS antenna port group according to the determined second transmission periodicity.

At step 720, the network node communicates information about the determined transmission periodicities to the one or more user equipment. In certain embodiments, the information communicated to the one or more user equipment about the determined transmission periodicities may comprise information about the determined transmission periodicity of each CSI-RS antenna port. In some cases, the information communicated to the one or more user equipment about the determined transmission periodicities may comprise information about the determined transmission periodicity for the first and second CSI-RS antenna port groups. In certain embodiments, the network node may configure the one or more user equipment with a first channel state information (CSI) reporting periodicity for the CSI-RS corresponding to the first group of CSI-RS antenna ports and a second CSI reporting periodicity for the CSI-RS corresponding to the second group of CSI-RS antenna ports.

In certain embodiments, the network node may configure the one or more user equipment to report CSI feedback calculated using the first CSI-RS antenna port group. The network node may determine a need for CSI feedback calculated using the first CSI-RS antenna port group and the second CSI-RS antenna port group, and trigger the one or more user equipment to report CSI feedback calculated using the first CSI-RS antenna port group and the second CSI-RS antenna port group. The network node may trigger the one or more user equipment to report CSI feedback calculated using the first CSI-RS antenna port group and the second CSI-RS antenna port group by transmitting, to the one or more user equipment, one of a downlink grant and a medium access control element. The network node may receive, from the one or more user equipment, a first CSI feedback report corresponding to the first CSI-RS antenna port group and a second CSI feedback report corresponding to the second CSI-RS antenna port group.

Figure 8:
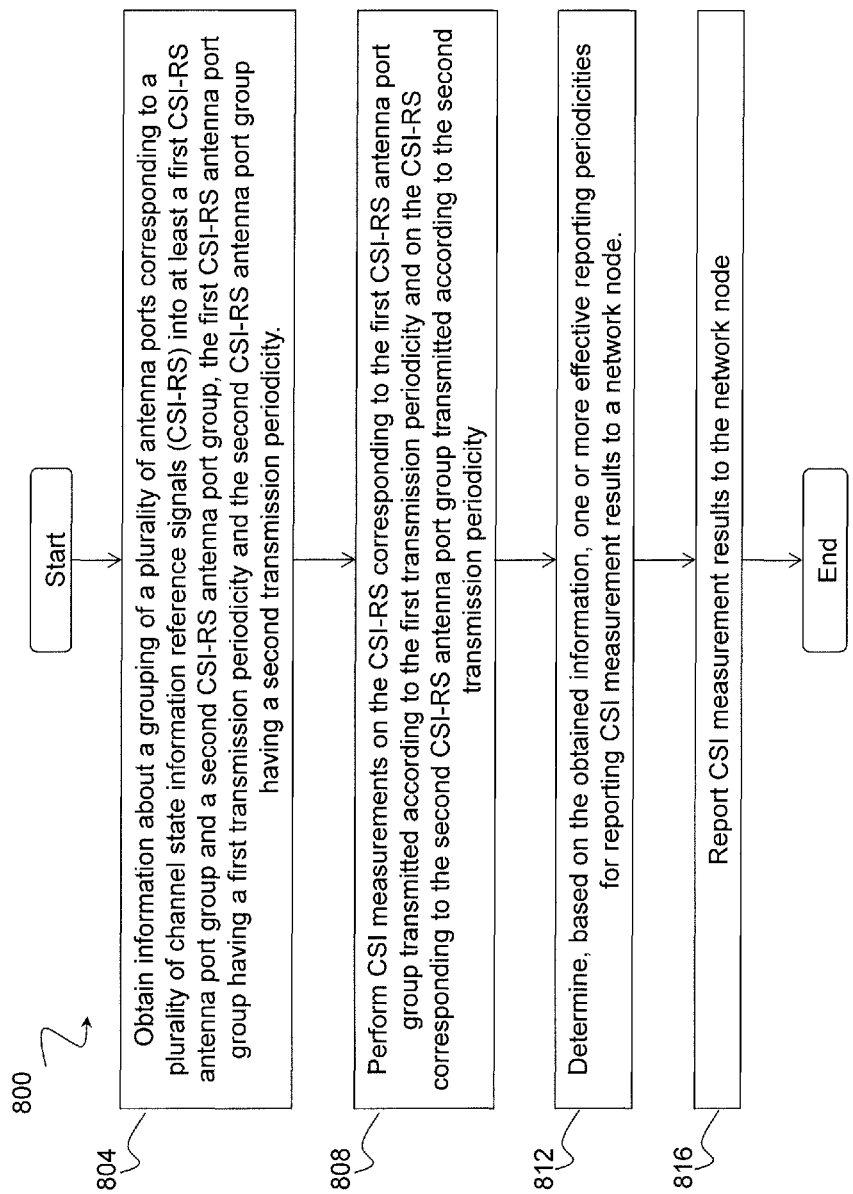
FIG. 8 is a flow diagram of a method in a wireless device, in accordance with an embodiment.

FIG. 8 is a flow diagram of a method in a UE, in accordance with an embodiment. The method begins at step 804, where the wireless device obtains information about a grouping of a plurality of antenna ports corresponding to a plurality of channel state information reference signals (CSI-RS) into at least a first CSI-RS antenna port group and a second CSI-RS antenna port group, the first CSI-RS antenna port group having a first transmission periodicity and the second CSI-RS antenna port group having a second transmission periodicity such that the CSI-RS corresponding to the antenna ports of the first CSI-RS antenna port group are transmitted at a different time than the CSI-RS corresponding to the antenna ports of the second CSI-RS antenna port group. The CSI-RS may be grouped in any suitable manner. For example, the first CSI-RS antenna port group may comprise a subset of the plurality of antenna ports corresponding to CSI-RS used to compute CSI in the horizontal (azimuth) direction, and the second CSI-RS antenna port group may comprise a subset of the plurality of antenna ports corresponding to CSI-RS used to compute CSI in the vertical (elevation) domain. In certain embodiments, obtaining information may comprise receiving information about the first transmission periodicity of the first CSI-RS antenna port group and the second transmission periodicity of the second CSI-RS antenna port group. The received information may comprise one of: information about a determined transmission periodicity of each CSI-RS antenna port; and information about a determined transmission periodicity of the first and second CSI-RS antenna port groups. In some cases, the first and second transmission periodicities may be measured in transmission time intervals.

In certain embodiments, the UE may determine a recommended value or range of values for the first transmission periodicity of the first CSI-RS antenna port group and the second transmission periodicity of the second CSI-RS antenna port group. The UE may send, to a network node, the determined recommended value or range of values for the first transmission periodicity of the first CSI-RS antenna port group and the second transmission periodicity of the second CSI-RS antenna port group. The determined recommended value or range of values for the first and second transmission periodicities may be based on one or more criteria, the one or more criteria comprising a location of the user equipment, a speed of the user equipment, or any other suitable criteria.

At step 808, the UE performs CSI measurements on the CSI-RS corresponding to the first CSI-RS antenna port group transmitted according to the first transmission periodicity and on the CSI-RS corresponding to the second CSI-RS antenna port group transmitted according to the second transmission periodicity.

In certain embodiments, the UE may perform CSI measurements on CSI-RS corresponding to the first CSI-RS antenna port group transmitted according to the first transmission periodicity and on CSI-RS corresponding to the second CSI-RS antenna port group transmitted according to the second transmission periodicity by determining, at a first point in time, a first channel estimate based on the CSI-RS corresponding to the antenna ports of the first CSI-RS antenna port group transmitted according to the first transmission periodicity, and by determining, at a second point in time later than the first point in time, a second channel estimate based on the CSI-RS corresponding to the antenna ports of the second CSI-RS antenna port group transmitted according to the second transmission periodicity. The UE may form a channel matrix using the first channel estimate based on the CSI-RS corresponding to the first CSI-RS antenna port group and the second channel estimate based on the CSI-RS corresponding to the second CSI-RS antenna port group, and compute one or more channel state information (CSI) parameters based on the channel matrix. In certain embodiments, the UE may determine, at a third point in time later than the second point in time, a third channel estimate based on the CSI-RS corresponding to the antenna ports of the first CSI-RS antenna port group transmitted according to the first transmission periodicity. The UE may update the channel matrix using the second channel estimate based on the CSI-RS corresponding to the second CSI-RS antenna port group and the third channel estimate based on the CSI-RS corresponding to the first CSI-RS antenna port group. The UE may compute one or more channel state information parameters based on the updated channel matrix.

At step 812, the UE determines, based on the obtained information, one or more effective reporting periodicities for reporting CSI measurement results to a network node.

At step 816, the UE reports CSI measurement results to the network node. In certain embodiments, reporting CSI measurement results to the network node may comprise reporting CSI measurements to the network node according to the determined one or more effective reporting periodicities. In certain embodiments, reporting CSI measurement results to the network node may comprise transmitting CSI feedback calculated using the first CSI-RS antenna port group. In some cases, the UE may transmit, to the network node, a first CSI feedback report corresponding to the first CSI-RS antenna port group and a second CSI feedback report corresponding to the second CSI-RS antenna port group, wherein transmitting the first CSI feedback report and the second CSI feedback report is triggered by the network node. In certain embodiments, transmitting the first CSI feedback report and the second CSI feedback report may be triggered upon one or more of: receiving a downlink grant; and receiving a medium access control element.

Figure 9:
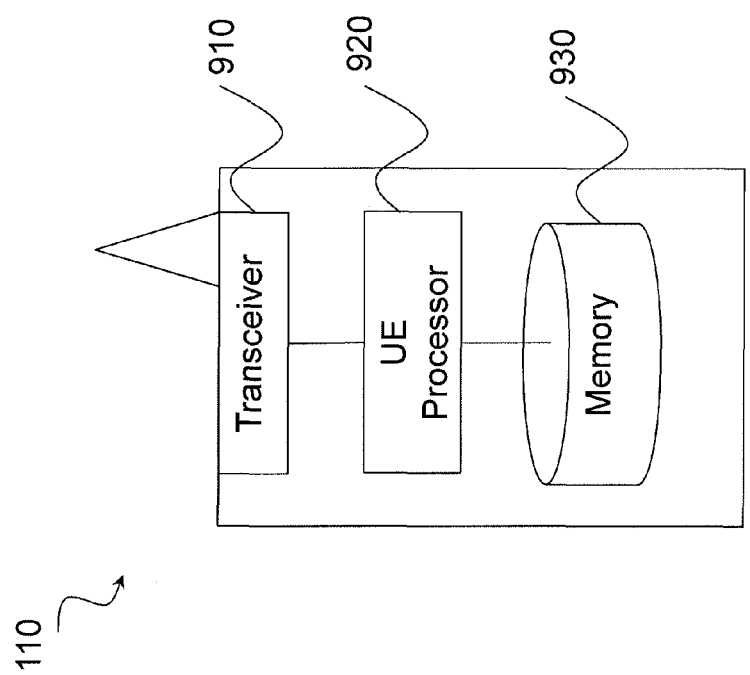
FIG. 9 is a schematic block diagram of an exemplary wireless device, in accordance with certain embodiments.

FIG. 9 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via an antenna), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 5 and 6. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 920.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
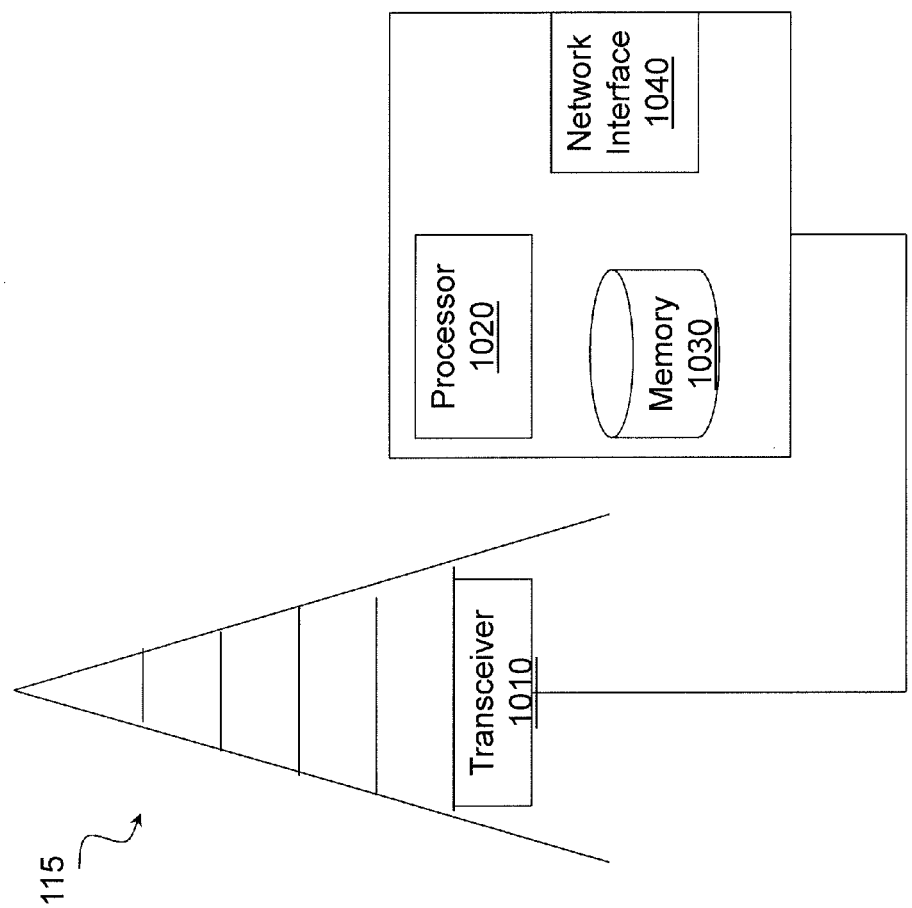
FIG. 10 is a schematic block diagram of an exemplary network node, in accordance with certain embodiments.

FIG. 10 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via an antenna), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers 130, etc.

Processor 1020 may include any suitable combination of hardware and software implemented in one or more modules to execute instructions and manipulate data to perform some or all of the described functions of network node 115, such as those described above in relation to FIGS. 5 and 6. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
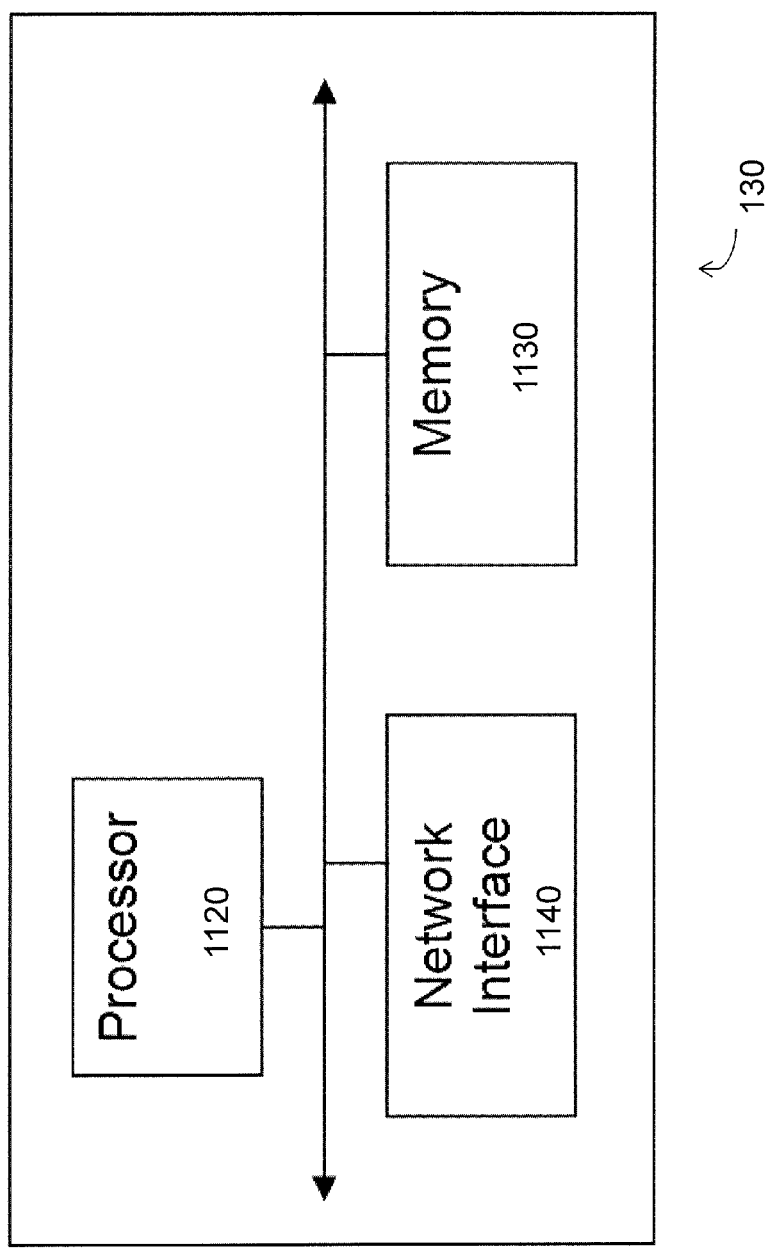
FIG. 11 is a schematic block diagram of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
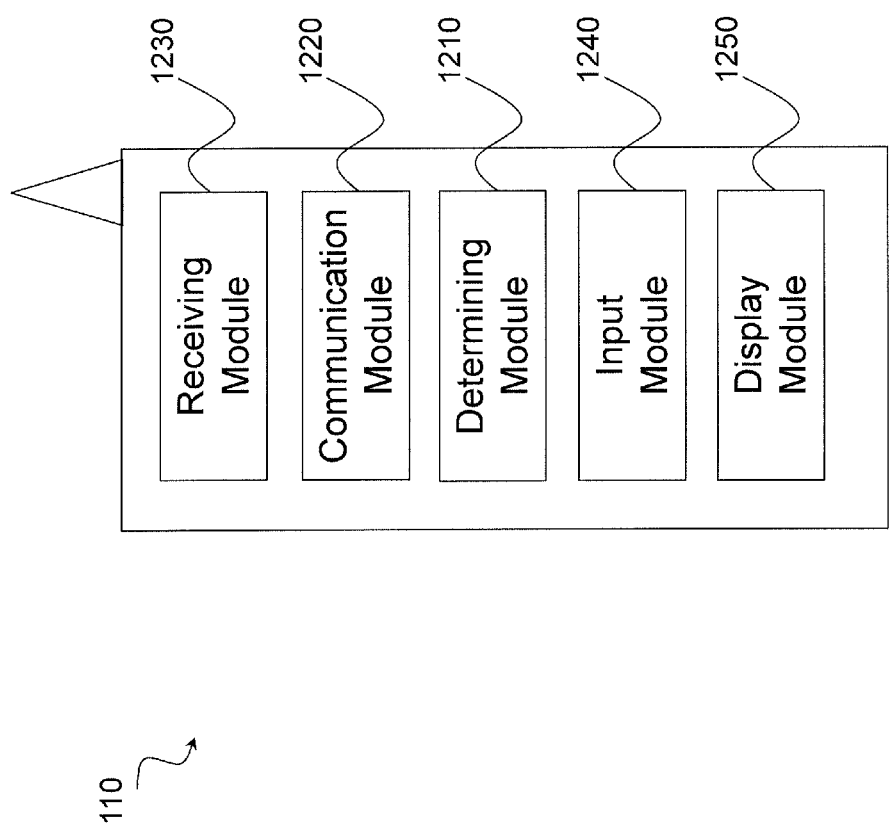
FIG. 12 is a schematic block diagram of an exemplary wireless device, in accordance with certain embodiments.

FIG. 12 is a schematic block diagram of an exemplary wireless device, in accordance with certain embodiments. Wireless device 110 may include one or more modules. For example, wireless device 110 may include a determining module 1210, a communication module 1220, a receiver module 1230, an input module 1240, a display module 1250, and any other suitable modules.

Determining module 1210 may perform the processing functions of wireless device 110. For example, determining module 1210 may perform CSI measurements on CSI-RS corresponding to the first CSI-RS antenna port group transmitted according to the first transmission periodicity and on CSI-RS corresponding to the second CSI-RS antenna port group transmitted according to the second transmission periodicity. As another example, determining module 1210 may determine, based on the obtained information, one or more effective reporting periodicities for reporting CSI measurement results to the network node. As yet another example, determining module 1210 may determine a recommended value or range of values for the first transmission periodicity of the first CSI-RS antenna port group and the second transmission periodicity of the second CSI-RS antenna port group. Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 described above may, in certain embodiments, be performed in one or more distinct modules.

Communication module 1220 may perform the transmission functions of wireless device 110. For example, communication module 1220 may report CSI measurement results to a network node. As another example, communication module 1220 may send, to the network node, the determined recommended value or range of values for the first transmission periodicity of the first CSI-RS antenna port group and the second transmission periodicity of the second CSI-RS antenna port group. As yet another example, communication module 1220 may transmit a first CSI feedback report corresponding to the first CSI-RS antenna port group and a second CSI feedback report corresponding to the second CSI-RS antenna port group upon being triggered by the network node. Communication module 1220 may transmit messages to one or more of network nodes 115 of network 100. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210.

Receiving module 1230 may perform the receiving functions of wireless device 110. For example, receiving module 1230 may obtain information about a grouping of a plurality of antenna ports corresponding to a plurality of channel state information reference signals (CSI-RS) into at least a first CSI-RS antenna port group and a second CSI-RS antenna port group. Receiving module 1230 may include a receiver and/or a transceiver. Receiving module 1230 may include circuitry configured to wirelessly receive messages and/or signals. In particular embodiments, receiving module 1230 may communicate received messages and/or signals to determining module 1210.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210.

Display module 1250 may present signals on a display of wireless device 110. Display module 1250 may include the display and/or any appropriate circuitry and hardware configured to present signals on the display. Display module 1250 may receive signals to present on the display from determining module 1210.

Determining module 1210, communication module 1220, receiving module 1230, input module 1240, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
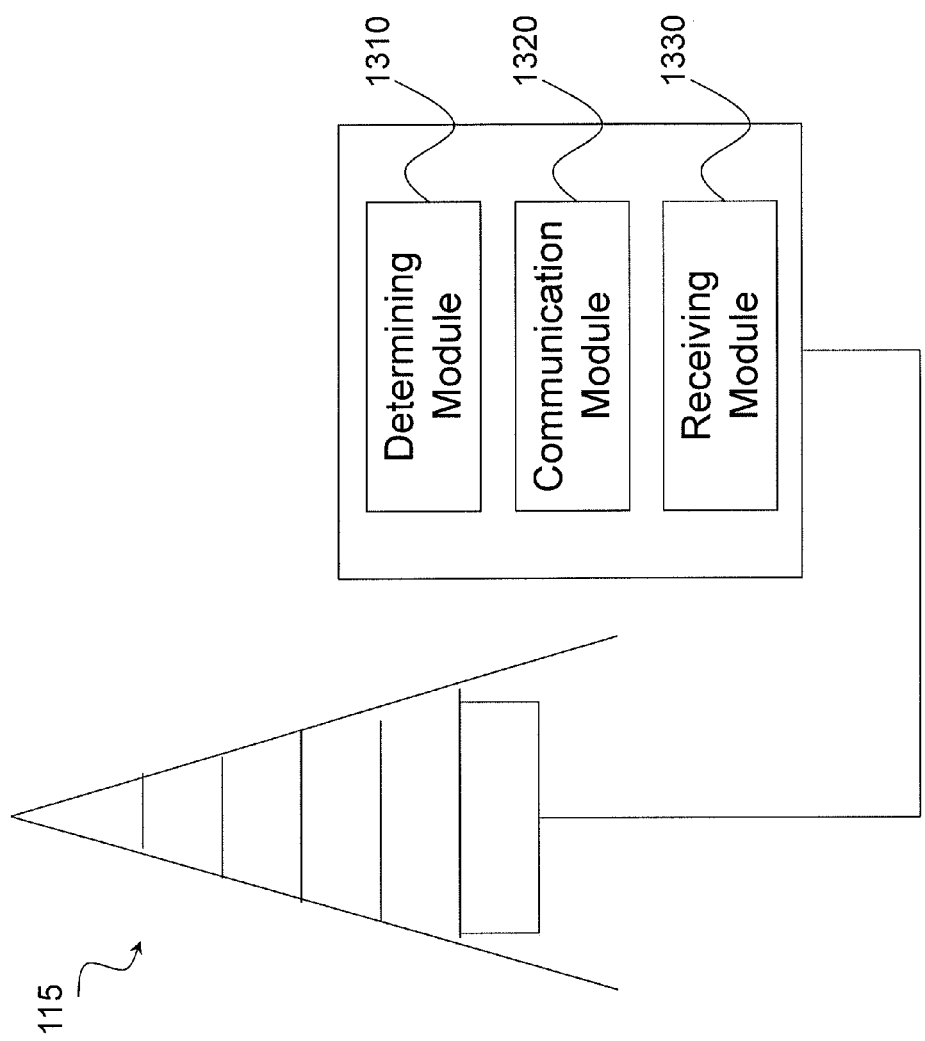
FIG. 13 is a schematic block diagram of an exemplary network node, in accordance with certain embodiments.

FIG. 13 is a schematic block diagram of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processor 1020 described above in relation to FIG. 10. In certain embodiments, the functions of two or more of the various modules may be combined into a single module.

Determining module 1310 may perform the processing functions of network node 115. As one example, determining module 1310 may group a plurality of antenna ports corresponding to a plurality of channel state information reference signals (CSI-RS) into at least a first CSI-RS antenna port group and a second CSI-RS antenna port group. Determining module 1310 may determine, based at least in part on one or more criteria, a first transmission periodicity for the first CSI-RS antenna port group and a second transmission periodicity for the second CSI-RS antenna port group. As yet another example, determining module 1310 may compare the Doppler metric or speed of the one or more user equipment to a first threshold value, and determine the first transmission periodicity of the first CSI-RS antenna port group and the second transmission periodicity of the second CSI-RS antenna port group based at least in part on the comparison. As still another example, determining module 1310 may configure the one or more user equipment to report CSI feedback calculated using the first CSI-RS antenna port group, and determine a need for CSI feedback calculated using the first CSI-RS antenna port group and the second CSI-RS antenna port group. Determining module 1310 may include or be included in one or more processors, such as processor 1020 described above in relation to FIG. 10. Determining module 1310 may include analog and/or digital circuitry configured to perform any of the functions of determining module 1310 and/or processor 1020 described above. The functions of determining module 1310 may, in certain embodiments, be performed in one or more distinct modules.

Communication module 1320 may perform the transmission functions of network node 115. As one example, communication module 1320 may transmit, to one or more user equipment, the CSI-RS corresponding to the antenna ports in the first CSI-RS antenna port group according to the determined first transmission periodicity, and transmit, to the one or more user equipment, the CSI-RS corresponding to the antenna ports in the second CSI-RS antenna port group according to the determined second transmission periodicity. As another example, communication module 1320 may communicate information about the determined transmission periodicities to the one or more user equipment. As yet another example, communication module 1320 may trigger the one or more user equipment to report CSI feedback calculated using the first CSI-RS antenna port group and the second CSI-RS antenna port group by transmitting, to the one or more user equipment, one of a downlink grant and a medium access control element. Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module.

Receiving module 1330 may perform the receiving functions of network node 115. For example, receiving module 1330 may receive, from the one or more user equipment, a recommended value or range of values for the first transmission periodicity of the first CSI-RS antenna port group and the second transmission periodicity of the second CSI-RS antenna port group. Receiving module 1330 may receive any suitable information from a wireless device. Receiving module 1330 may include a receiver and/or a transceiver. Receiving module 1330 may include circuitry configured to wirelessly receive messages and/or signals. In particular embodiments, receiving module 1330 may communicate received messages and/or signals to determining module 1310 or any other suitable module.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
MIMO Multiple input multiple output
Tx Transmitter
HSDPA High Speed Downlink Packet Access
DCI Downlink control Index
HARQ Hybrid automatic repeat request
CRC Cyclic redundancy check
NAK Non-acknowledgement
ACK Acknowledgement
UE User Equipment
CQI Channel quality information
MMSE Minimum Mean Square Error
ML Maximum Likelihood
MAP Maximum Aposteriori Probability
TTI Transmit Time Interval
PCI Precoding control index
BS Base Station
D2D Device-to-Device
HD Half Duplex
M2M Machine-To-Machine
MTC Machine-Type Communication
UE User Equipment
eNB Evolved Node B, base station
E-UTRAN Evolved universal terrestrial radio access network
E-UTRA Evolved universal terrestrial radio access
E-UTRA FDDE-UTRA frequency division duplex
E-UTRA TDDE-UTRA time division duplex
LTE Long term evolution
RAT Radio Access Technology
RRC Radio resource control
TDD Time division duplex
BSC Base station Controller
HSPA High Speed Packet Access
GSM Global system for mobile communication
UTRA Universal terrestrial radio access
UTRAFDD UTRA frequency division duplex
UTRA TDD UTRA time division duplex
WLAN Wireless Local Area Network
GERAN GSM EDGE Radio Access Network
EDGE Enhanced Data rates for GSM Evolution
CDMA2000 Code division multiple access 2000
HRPD High rate packet data
DL Downlink
PDCCH Physical Downlink Control Channel
PCFICH Physical Control format Indicator
PDSCH Physical Downlink Shared Channel
PHI CH Physical Hybrid ARQ Indicator Channel
RE Resource Element
RB Resource Block
RS Reference signal
SINR Signal-to-Interference Ratio

The invention claimed is:

1. A method in a network node, comprising:
grouping a plurality of antenna ports corresponding to a plurality of channel state information reference signals (CSI-RS) into at least a first CSI-RS antenna port group and a second CSI-RS antenna port group;
determining, based at least in part on one or more criteria, a first transmission periodicity for the first CSI-RS antenna port group and a second transmission periodicity for the second CSI-RS antenna port group;
configuring one or more user equipment with a first channel state information (CSI) reporting periodicity for the CSI-RS corresponding to the first CSI-RS antenna port group and a second CSI reporting periodicity for the CSI-RS corresponding to the second CSI-RS antenna port group;
transmitting, to the one or more user equipment, the CSI-RS corresponding to the antenna ports in the first CSI-RS antenna port group according to the determined first transmission periodicity;
transmitting, to the one or more user equipment, the CSI-RS corresponding to the antenna ports in the second CSI-RS antenna port group according to the determined second transmission periodicity;
configuring the one or more user equipment to report CSI feedback calculated using the first CSI-RS antenna port group;
determining a need for CSI feedback calculated using the first CSI-RS antenna port group and the second CSI-RS antenna port group; and
triggering the one or more user equipment to report CSI feedback calculated using the first CSI-RS antenna port group and the second CSI-RS antenna port group, wherein triggering the one or more user equipment to report CSI feedback comprises transmitting, to the one or more user equipment, one of a downlink grant and a medium access control element.

2. The method of claim 1, further comprising communicating information about the determined transmission periodicities to the one or more user equipment.

3. The method of claim 2, wherein the information communicated to the one or more user equipment about the determined transmission periodicities comprises information about the determined transmission periodicity of each CSI-RS antenna port.

4. The method of claim 2, wherein the information communicated to the one or more user equipment about the determined transmission periodicities comprises information about the determined transmission periodicity for the first and second CSI-RS antenna port groups.

5. The method of claim 1, wherein the first CSI-RS antenna port group and second CSI-RS antenna port group are predefined.

6. The method of claim 1, further comprising receiving, from the one or more user equipment, a recommended value or range of values for the first transmission periodicity of the first CSI-RS antenna port group and the second transmission periodicity of the second CSI-RS antenna port group.

7. The method of claim 1, wherein the one or more criteria comprise one or more of:
an application or use case;
a Doppler metric of one or more user equipment;
a speed of the one or more user equipment; and
a recommendation of the one or more user equipment.

8. The method of claim 7, wherein:
the one or more criteria comprise the application or use case; and
the first transmission periodicity of the first CSI-RS antenna port group is determined independently from the second transmission periodicity of the second CSI-RS antenna port group.

9. The method of claim 8, wherein:
the first CSI-RS antenna port group comprises a subset of the plurality of antenna ports corresponding to CSI-RS used to compute CSI in the horizontal (azimuth) direction; and
the second CSI-RS antenna port group comprises a subset of the plurality of antenna ports corresponding to CSI-RS used to compute CSI in the vertical (elevation) domain.

10. The method of claim 7, wherein the one or more criteria comprise the Doppler metric or speed of the one or more user equipment, and the method further comprises:
comparing the Doppler metric or speed of the one or more user equipment to a first threshold value; and
determining the first transmission periodicity of the first CSI-RS antenna port group and the second transmission periodicity of the second CSI-RS antenna port group based at least in part on the comparison.

11. The method of claim 10, wherein the Doppler metric or speed of the one or more user equipment is below the first threshold value, and the method further comprises:
setting the value of the second transmission periodicity of the second CSI-RS antenna port group to a higher value than the first transmission periodicity of the first CSI-RS antenna group such that the CSI-RS corresponding to the second CSI-RS antenna port group are transmitted less frequently than the CSI-RS corresponding to the first CSI-RS antenna port group.

12. The method of claim 1, wherein the first and second transmission periodicities are measured in transmission time intervals.

13. The method of claim 1, further comprising receiving, from the one or more user equipment:
a first CSI feedback report corresponding to the first CSI-RS antenna port group; and
a second CSI feedback report corresponding to the second CSI-RS antenna port group.

14. A network node, comprising:
one or more processors, the one or more processors configured to:
group a plurality of antenna ports corresponding to a plurality of channel state information reference signals (CSI-RS) into at least a first CSI-RS antenna port group and a second CSI-RS antenna port group;
determine, based at least in part on one or more criteria, a first transmission periodicity for the first CSI-RS antenna port group and a second transmission periodicity for the second CSI-RS antenna port group;
configure one or more user equipment with a first channel state information (CSI) reporting periodicity for the CSI-RS corresponding to the first CSI-RS antenna port group and a second CSI reporting periodicity for the CSI-RS corresponding to the second CSI-RS antenna port group;
transmit, to the one or more user equipment, the CSI-RS corresponding to the antenna ports in the first CSI-RS antenna port group according to the determined first transmission periodicity;
transmit, to the one or more user equipment, the CSI-RS corresponding to the antenna ports in the second CSI-RS antenna port group according to the determined second transmission periodicity;
configure the one or more user equipment to report CSI feedback calculated using the first CSI-RS antenna port group;
determine a need for CSI feedback calculated using the first CSI-RS antenna port group and the second CSI-RS antenna port group; and
trigger the one or more user equipment to report CSI feedback calculated using the first CSI-RS antenna port group and the second CSI-RS antenna port group, wherein the one or more processors configured to trigger the one or more user equipment to report CSI feedback comprise one or more processors configured to transmit, to the one or more user equipment, one of a downlink grant and a medium access control element.

15. The network node of claim 14, wherein the one or more processors are further configured to communicate information about the determined transmission periodicities to the one or more user equipment.

16. The network node of claim 15, wherein the information about the determined transmission periodicities comprises information about the determined transmission periodicity of each CSI-RS antenna port.

17. The network node of claim 15, wherein the information about the determined transmission periodicities comprises information about the determined transmission periodicity for the first and second CSI-RS antenna port groups.

18. The network node of claim 14, wherein the first CSI-RS antenna port group and second CSI-RS antenna port group are predefined.

19. The network node of claim 14, wherein the one or more processors are further configured to receive, from the one or more user equipment, a recommended value or range of values for the first transmission periodicity of the first CSI-RS antenna port group and the second transmission periodicity of the second CSI-RS antenna port group.

20. The network node of claim 14, wherein the one or more criteria comprise one or more of:
an application or use case;
a Doppler metric of one or more user equipment;
a speed of the one or more user equipment; and
a recommendation of the one or more user equipment.

21. The network node of claim 20, wherein:
the one or more criteria comprise the application or use case; and
the one or more processors are configured to determine the first transmission periodicity of the first CSI-RS antenna port group independently from the second transmission periodicity of the second CSI-RS antenna port group.

22. The network node of claim 21, wherein:
the first CSI-RS antenna port group comprises a subset of the plurality of antenna ports corresponding to CSI-RS used to compute CSI in the horizontal (azimuth) direction; and the second CSI-RS antenna port group comprises a subset of the plurality of antenna ports corresponding to CSI-RS used to compute CSI in the vertical (elevation) domain.

23. The network node of claim 20, wherein the one or more criteria comprise the Doppler metric or speed of the one or more user equipment, and the one or more processors are further configured to:
  compare the Doppler metric or speed of the one or more user equipment to a first threshold value; and
  determine the first transmission periodicity of the first CSI-RS antenna port group and the second transmission periodicity of the second CSI-RS antenna port group based at least in part on the comparison.

24. The network node of claim 23, wherein the Doppler metric or speed of the one or more user equipment is below the first threshold value, and the one or more processors are further configured to:
  set the value of the second transmission periodicity of the second CSI-RS antenna port group to a higher value than the first transmission periodicity of the first CSI-RS antenna group such that the CSI-RS corresponding to the second CSI-RS antenna port group are transmitted less frequently than the CSI-RS corresponding to the first CSI-RS antenna port group.

25. The network node of claim 14, wherein the first and second transmission periodicities are measured in transmission time intervals.

26. The network node of claim 14, wherein the one or more processors are further configured to receive, from the one or more user equipment:
  a first CSI feedback report corresponding to the first CSI-RS antenna port group; and
  a second CSI feedback report corresponding to the second CSI-RS antenna port group.

* * * * *